US012524817B2

(12) United States Patent
Rusu et al.

(10) Patent No.: US 12,524,817 B2
(45) Date of Patent: *Jan. 13, 2026

(54) TRANSACTION DATA PROCESSING SYSTEMS AND METHODS

(71) Applicant: Xero Limited, Wellington (NZ)

(72) Inventors: Delia Rusu, Wellington (NZ); Hayden Jeune, Wellington (NZ); Rebecca Dridan, Wellington (NZ); Soon-Ee Cheah, Wellington (NZ); Brett Calcott, Wellington (NZ); Zhimin Wang, Wellington (NZ); Quentin-Gabriel Thurier, Wellington (NZ); Fubiao Qin, Wellington (NZ); Niklas Patrick Pechan, Wellington (NZ)

(73) Assignee: Xero Limited, Wellington (NZ)

( * ) Notice: Subject to any disclaimer, the term of this patent is extended or adjusted under 35 U.S.C. 154(b) by 134 days.

This patent is subject to a terminal disclaimer.

(21) Appl. No.: 17/842,523

(22) Filed: Jun. 16, 2022

(65) Prior Publication Data

US 2022/0351302 A1 Nov. 3, 2022
US 2023/0377053 A9 Nov. 23, 2023

Related U.S. Application Data

(63) Continuation of application No. 17/693,300, filed on Mar. 11, 2022, which is a continuation of application
(Continued)

(30) Foreign Application Priority Data

Dec. 23, 2020 (AU) .............................. 2020904805

(51) Int. Cl.
G06Q 40/12 (2023.01)
G06F 40/279 (2020.01)
(Continued)

(52) U.S. Cl.
CPC ........... G06Q 40/12 (2013.12); G06F 40/279 (2020.01); G06F 40/284 (2020.01); G06F 40/30 (2020.01); *G06N 20/00* (2019.01)

(58) Field of Classification Search
CPC ........ G06Q 40/12; G06Q 30/06; G06Q 40/02; G06F 40/279; G06F 40/284; G06F 40/30; G06N 20/00; G06N 3/045; G06N 3/084
See application file for complete search history.

(56) References Cited

U.S. PATENT DOCUMENTS 4,948,174 A 8/1990 Thomson et al.
7,206,768 B1 4/2007 deGroeve et al.
(Continued)

FOREIGN PATENT DOCUMENTS

JP 2018198046 A 12/2018
WO 2006017630 A2 2/2006
(Continued)

OTHER PUBLICATIONS

International Search Report and Written Opinion as issued in connection with International Patent Application No. PCT/NZ21/050151, mailed Dec. 20, 2021, 17 pages.
(Continued)

*Primary Examiner* — Michael Jared Walker
*Assistant Examiner* — Jessica E Sullivan
(74) *Attorney, Agent, or Firm* — Young Basile Hanlon & MacFarlane, P.C.

(57) ABSTRACT

Described embodiments relate to determining a candidate financial record associated with a transaction between a first accounting entity and a second entity, and determining, using a numerical representation generation model, a numerical representation of the candidate financial record, the numerical representation generation model having been trained on a corpus generated from historical transaction
(Continued)

records. The method further comprises providing, to a transaction attribute prediction model, the numerical representation of the candidate financial record, the transaction attribute prediction model having been trained using a dataset of previously reconciled financial records, each associated with a respective first transaction attribute; and determining, by the transaction attribute prediction model, at least one first transaction attribute associated with the candidate financial record.

16 Claims, 10 Drawing Sheets

Related U.S. Application Data

No. PCT/NZ2021/050151, filed on Aug. 25, 2021, application No. 17/842,523 is a continuation of application No. PCT/NZ2021/050151, filed on Aug. 25, 2021.

(51) Int. Cl.
*G06F 40/284* (2020.01)
*G06F 40/30* (2020.01)
*G06N 20/00* (2019.01)

(56) References Cited

U.S. PATENT DOCUMENTS

| | | | |
|---|---|---|---|
| 7,483,871 | B2 | 1/2009 | Herz |
| 7,536,354 | B1 | 5/2009 | deGroeve et al. |
| 7,912,702 | B2 | 3/2011 | Bennett |
| 8,458,067 | B2 | 6/2013 | Arguelles et al. |
| 8,712,887 | B2 | 4/2014 | DeGroeve et al. |
| 8,930,295 | B2 | 1/2015 | Campbell et al. |
| 9,323,784 | B2 | 4/2016 | King et al. |
| 9,324,119 | B2 | 4/2016 | Singh et al. |
| 9,563,920 | B2 | 2/2017 | Lall |
| 9,984,344 | B2 | 5/2018 | Singh et al. |
| 10,204,312 | B2 | 2/2019 | Singh et al. |
| 10,276,170 | B2 | 4/2019 | Gruber et al. |
| 10,318,882 | B2 | 6/2019 | Brueckner et al. |
| 10,664,785 | B2 | 5/2020 | Gill et al. |
| 10,740,561 | B1 | 8/2020 | Cao et al. |
| 10,741,185 | B2 | 8/2020 | Gruber et al. |
| 10,789,034 | B2 | 9/2020 | Rao |
| 11,416,867 | B2 | 8/2022 | Lopes et al. |
| 11,481,689 | B2 * | 10/2022 | Dong ........................ G06F 8/10 |
| 11,868,436 | B1 | 1/2024 | Gokalp et al. |
| 2003/0037041 | A1 | 2/2003 | Hertz |
| 2007/0061260 | A1 | 3/2007 | deGroeve et al. |
| 2008/0052078 | A1 | 2/2008 | Bennett |
| 2010/0057502 | A1 | 3/2010 | Arguelles et al. |
| 2011/0153653 | A1 | 6/2011 | King et al. |
| 2012/0303562 | A1 | 11/2012 | Paguio |
| 2013/0091052 | A1 | 4/2013 | Kaperdal et al. |
| 2014/0074762 | A1 | 3/2014 | Campbell |
| 2014/0279304 | A1 | 9/2014 | Lall |
| 2016/0078361 | A1 * | 3/2016 | Brueckner .............. H04L 67/10 706/12 |
| 2017/0012418 | A1 | 1/2017 | Roux et al. |
| 2017/0236080 | A1 | 8/2017 | Singh et al. |
| 2017/0315767 | A1 | 11/2017 | Rao |
| 2017/0330121 | A1 | 11/2017 | Sullivan et al. |
| 2018/0030060 | A1 | 2/2018 | Petrukhin et al. |
| 2018/0285773 | A1 * | 10/2018 | Hsiao ..................... G06N 20/20 |
| 2018/0314996 | A1 | 11/2018 | Singh et al. |
| 2018/0330412 | A1 | 11/2018 | Fredriksson et al. |
| 2019/0066204 | A1 | 2/2019 | Teixeira et al. |
| 2019/0066214 | A1 | 2/2019 | Teixeira et al. |
| 2019/0066215 | A1 | 2/2019 | Teixeira et al. |
| 2019/0066216 | A1 | 2/2019 | Teixeira et al. |
| 2019/0121904 | A1 * | 4/2019 | Gilling .................. G06F 16/334 |
| 2019/0244147 | A1 | 8/2019 | Singh et al. |
| 2019/0251057 | A1 | 8/2019 | Robinson et al. |
| 2019/0251058 | A1 * | 8/2019 | Robinson ................ G06F 18/24 |
| 2020/0073882 | A1 * | 3/2020 | Guggilla .................. G06N 5/02 |
| 2020/0074565 | A1 | 3/2020 | Dotter |
| 2020/0097812 | A1 | 3/2020 | Csar et al. |
| 2020/0098053 | A1 | 3/2020 | Lesner et al. |
| 2020/0210899 | A1 | 7/2020 | Guo |
| 2020/0311816 | A1 | 10/2020 | Calvin |
| 2020/0410583 | A1 | 12/2020 | Hart et al. |
| 2021/0011677 | A1 | 1/2021 | Rao |
| 2021/0027392 | A1 | 1/2021 | Goyal et al. |
| 2021/0073847 | A1 | 3/2021 | Whatley et al. |
| 2021/0350382 | A1 | 11/2021 | Lopes et al. |
| 2022/0028010 | A1 | 1/2022 | Jeske et al. |
| 2022/0044313 | A1 | 2/2022 | Cox et al. |
| 2022/0103589 | A1 | 3/2022 | Shen et al. |
| 2022/0108262 | A1 | 4/2022 | Cella et al. |

FOREIGN PATENT DOCUMENTS

| | | | |
|---|---|---|---|
| WO | 2007033095 | A2 | 3/2007 |
| WO | 2007112374 | A2 | 10/2007 |
| WO | 2008036998 | A1 | 4/2008 |
| WO | 2022139595 | A1 | 6/2022 |

OTHER PUBLICATIONS

Casey, M., et al., "The Impact of Blockchain Technology on Finance: A Catalyst for Change", Geneva Reports on the World Economy 21, pp. 106, (2018).
Efrag, "Accounting for Crypto-Assets (Liabilities): Holder and Issuer Perspective", pp. 152, (Jul. 2020).
Samoila, A. L., "Multiple Entity Reconciliation", KTH Royal Institute of Technology VionLabs, Stockholm, pp. 63, (Sep. 2015).
Scor, "P&C loss development triangles and reserves as of Dec. 2019", pp. 1-24 (2019).
Tookitaki, "What is data reconciliation and what is it used for in finance?", pp. 07, (May 20, 2020).
Weinberger, K., et al., "Feature Hashing for Large Scale Multitask Learning", CML '09: Proceedings of the 26th Annual International Conference on Machine Learning Jun. 14-18, 2009, pp. 1113-1120, (Jun. 2009).
Non-Final Office Action in U.S. Appl. No. 17/749,135 mailed on Aug. 26, 2022, 14 pages.
Notice of Allowance in U.S. Appl. No. 17/749,135 mailed on Nov. 30, 2022, 14 pages.
Non-Final Office Action in U.S. Appl. No. 17/693,300 mailed on Mar. 13, 2024, 27 pages.
Non-Final Office Action in U.S. Appl. No. 18/069,223 mailed on Apr. 30, 2024, 20 pages.
Extended European Search Report in European Application No. 21911642.3 mailed Oct. 22, 2024, 12 pages.
Final Office Action in U.S. Appl. No. 17/693,300 mailed on Aug. 27, 2024, 34 pages.
Final Office Action in U.S. Appl. No. 18/069,223 mailed on Sep. 5, 2024, 21 pages.
Non-Final Office Action in U.S. Appl. No. 17/693,300 mailed on Apr. 28, 2025, 21 pages.
Notice of Allowance in U.S. Appl. No. 18/069,223 mailed on May 30, 2025, 15 pages.

* cited by examiner

TRANSACTION DATA PROCESSING SYSTEMS AND METHODS

This application is a continuation of PCT Patent Application No. PCT/NZ2021/050151, filed Aug. 25, 2021, titled "Transaction Data Processing Systems And Methods," which claims priority to Australian Patent Application No. 2020904805 filed Dec. 23, 2020, titled "Transaction Data Processing Systems And Methods." This application is also a continuation of U.S. patent application Ser. No. 17/693,300, filed Mar. 11, 2022, titled "Transaction Data Processing Systems And Methods," which is a continuation of PCT Application No. PCT/NZ2021/050151, filed Aug. 25, 2021, titled "Transaction Data Processing Systems And Methods," which claims priority to Australian Patent Application No. 2020904805 filed Dec. 23, 2020, titled "Transaction Data Processing Systems And Methods," all of which is incorporated by reference in its entirety.

TECHNICAL FIELD

Embodiments generally relate to methods, systems, and computer-readable media for determining transaction attributes of financial records, and in some embodiments, to generate accounting records using the determined transaction attributes to allow for reconciliation of the financial records.

BACKGROUND

Reconciliation is a procedure for determining that the entries (accounting records) in an accounting system match corresponding entries in a financial record, such as a bank statement, or line items in a bank statement feed. When an accountant receives a financial record, such as a bank statement, the accountant has to analyse each entry in the bank statement to identify a corresponding account and account code and potentially further attributes associated with the entry to reconcile the entry with corresponding entries in the accounting system.

However, financial records generated by financial systems often include entries with insufficiently particularised details, which makes it difficult to identify the relevant information for reconcile. For example, an entry may not include the name of the payer; instead, it may include a general description of the nature of the transaction, such as taxes, drawings, or wages.

Because of the great degree of variability among financial records of a financial system, reconciliation can be a difficult and time-consuming task, more so for a computer program configured to automatically reconcile the data. A person may use their experience to identify the nature of transactions, but automating a computer program to automatically identify the nature of a transaction, as well as the parties of the transaction, is a difficult task due to the lack of standards in providing descriptions for entries in bank statements.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a method comprising: determining a candidate financial record associated with a transaction between a first accounting entity and a second entity; determining, using a numerical representation generation model, a numerical representation of the candidate financial record, the numerical representation generation model having been trained on a corpus generated from historical transaction records; providing, to a transaction attribute prediction model, the numerical representation of the candidate financial record, the transaction attribute prediction model having been trained using a dataset of previously reconciled financial records, each associated with a respective first transaction attribute; determining, by the transaction attribute prediction model, at least one first transaction attribute associated with the candidate financial record.

The method of some embodiments further comprises: providing, to the transaction attribute prediction model, numerical representations of each of a plurality of accounting entity specified first attributes; and wherein determining, by the transaction attribute prediction model, at least one first transaction attribute associated with the candidate financial record comprises: determining the first transaction attribute associated with the candidate financial record as being one of the plurality of accounting entity specified first attributes.

The method of some embodiments further comprises: determining, using the numerical representation generation model, a numerical representation of the accounting entity specified first attributes, the numerical representation generation model having been trained on the corpus generated from historical transaction records.

In some embodiments, the accounting entity specified first attributes comprises accounting entity defined first attributes. The accounting entity specified first attributes may comprise accounting system predefined first attributes.

The method of some embodiments further comprises sending, to a computing device, the determined at least one first transaction attribute for presentation on a user interface of a reconciliation application.

The method of some embodiments further comprises: receiving, from the computing device, approval of an approved first transaction attribute of the determined at least one first transaction attributes; and generating a reconciliation record associated with the transaction, the reconciliation record comprising the candidate financial record and the approved first transaction attribute.

The method of some embodiments further comprises: determining a confidence score associated with each of the determined at least one first transaction attribute; and responsive to determining that one or more of the confidence scores meet a confidence threshold, generating a reconciliation record associated with the transaction, the reconciliation record comprising the candidate financial record and the determined at least first transaction attributes having associated confidence scores than meet the confidence threshold.

In some embodiments, determining the numerical representation of the candidate financial record comprises: extracting one or more character strings from the candidate financial record; generating a set of tokens by tokenising each of the one or more character strings; generating, using the numerical representation generation model, a numerical representation of each token of the set of tokens; determining the numerical representation of the candidate financial record as a function of the numerical representations of each token of the set of tokens.

In some embodiments, determining the numerical representation of the candidate financial record comprises determining an average of the numerical representations of each token of the set of tokens.

In some embodiments, the corpus for training the numerical representation generation model may be generated using a combination of historical financial records and entity information associated with the respective historical financial records, and wherein the method of such embodiments may further comprise: determining the accounting entity associated with the candidate financial record; and determining one or more entity attributes from an accounting entity record associated with the first accounting entity; wherein generating the set of tokens further comprises tokenizing each of the one or more entity attributes.

The one or more entity attributes may comprise any one or more of: entity type; entity industry; and entity country.

In some embodiments, determining the numerical representation of the accounting entity specified first attributes may comprise: for each accounting entity specified first attribute: extracting one or more character strings from the candidate accounting entity specified first attribute; generating a set of tokens by tokenising each of the one or more character strings; generating, using the numerical representation generation model, a numerical representation of each token of the set of tokens; determining the numerical representation of the candidate accounting entity specified first attribute as a function of the numerical representations of each token of the set of tokens.

In some embodiments, determining the numerical representation of accounting entity specified first attribute may comprise determining an average of the numerical representations of each token of the set of tokens.

The candidate financial record may comprise financial data including any one or more of: payee data; transaction reference; and transaction notes.

In some embodiments, the at least one first transaction attribute is: an identifier of the second entity; or an account code identifier.

In some embodiments, the first transaction attribute is an account code identifier and the transaction attribute prediction model comprises an account code prediction model to determine an account code associated with the transaction.

The account code prediction model of some embodiments may comprise a neural network trained to: determine a confidence score associated with the candidate financial record and each one of a plurality of account code identifiers associated with the first accounting entity; and determine the at least one first transaction attribute as the account code identifiers having the highest confidence score. The neural network may comprise a feedforward neural network.

In some embodiments, the at least one first transaction attribute is an identifier of the second entity and the transaction attribute prediction model comprises an entity prediction model to predict the second entity associated with the transaction.

Some embodiments relate to a method comprising: generating, by one or more processors, a database of labelled objects by: determining a plurality of reconciled financial records; determining at least a first transaction attribute associated with each of the plurality of reconciled financial records; determining a numerical representation of each of the plurality of reconciled financial records; and labelling each numerical representation with the at least first transaction attribute associated with the respective reconciled financial record; training, by one or more processors, a transaction attribute prediction model to predict at least a first transaction attribute associated with a candidate financial record by providing, using the database of labelled objects; and providing the trained transaction attribute prediction model to a reconciliation application for reconciling transactions.

Some embodiments relate to a method comprising: generating, by one or more processors, training data, the training data comprising a plurality of objects, each object comprising a financial record and an associated first transaction attribute, the training data being generated by: determining a plurality of reconciled financial records; determining a first transaction attribute associated with each reconciled financial records of the plurality of reconciled financial records; determining a numerical representation of each of the plurality of reconciled financial records; and determining a numerical representation of the first attribute associated with each reconciled financial record; and associating the numerical representation of each reconciled financial transaction with the corresponding numerical representation of the first transaction attribute as an object of the training data; training, by one or more processors, a transaction attribute prediction model to predict a first transaction attribute associated with a candidate financial record by providing as inputs to the transaction attribute prediction model, the objects of the training data; and providing the trained transaction attribute prediction model to a reconciliation application for reconciling transactions. For example, the transaction attribute prediction model may comprise a neural network.

Some embodiments relate to a method comprising: extracting character strings from historical transaction records obtained from an accounting database; creating a corpus based on the extracted character strings; training a numerical representation generation model to generate numerical representation of data based on the corpus by providing as inputs to the numerical representation generation model the corpus; wherein the numerical representation generation model is configured to determine proximate occurrence information of each of the extracted character strings in the corpus.

Some embodiments relate to a system comprising: at-least one processor configured to communicate with a memory, wherein the memory comprises program code executable by the at-least one processor to: determine a candidate financial record associated with a transaction between a first accounting entity and a second entity; determine, using a numerical representation generation model provided in the memory, a numerical representation of the candidate financial record, the numerical representation generation model having been trained on a corpus generated from historical transaction records; provide, to a transaction attribute prediction model provided in the memory, the numerical representation of the candidate financial record, the transaction attribute prediction model having been trained using a dataset of previously reconciled financial records, each associated with a respective first transaction attribute; determine, by the transaction attribute prediction model, at least one first transaction attribute associated with the candidate financial record.

Some embodiments relate to a system comprising: at least one processor configured to communicate with a memory, wherein the memory comprises program code executable by the at-least one processor to: generate, a database of labelled objects by: determining a plurality of reconciled financial records; determining at least a first transaction attribute associated with each of the plurality of reconciled financial records; determining a numerical representation of each of the plurality of reconciled financial records; and labelling each numerical representation with the at least first transaction attribute associated with the respective reconciled financial record; train, a transaction attribute prediction model to predict at least a first transaction attribute associated with a candidate financial record by providing, using the database of labelled objects; and provide the trained transaction attribute prediction model to a reconciliation application for reconciling transactions.

Some embodiments relate to a system comprising: at least one processor configured to communicate with a memory, wherein the memory comprises program code executable by the at-least one processor to: generate, training data, the training data comprising a plurality of objects, each object comprising a financial record and an associated first transaction attribute, the training data being generated by: determining a plurality of reconciled financial records; determining a first transaction attribute associated with each reconciled financial records of the plurality of reconciled financial records; determining a numerical representation of each of the plurality of reconciled financial records; and determining a numerical representation of the first attribute associated with each reconciled financial record; and associate the numerical representation of each reconciled financial transaction with the corresponding numerical representation of the first transaction attribute as an object of the training data; train, a transaction attribute prediction model to predict a first transaction attribute associated with a candidate financial record by providing as inputs to the transaction attribute prediction model, the objects of the training data; and provide the trained transaction attribute prediction model to a reconciliation application for reconciling transactions.

Some embodiments relate to a system comprising: at least one processor configured to communicate with a memory, wherein the memory comprises program code executable by the at-least one processor to: extract character strings from historical transaction records obtained from an accounting database; create a corpus based on the extracted character strings; train a numerical representation generation model to generate numerical representation of data based on the corpus by providing as inputs to the numerical representation generation model the corpus; wherein the numerical representation generation model is configured to determine proximate occurrence information of each of the extracted character strings in the corpus.

Some embodiments relate to a method comprising: determining a set of example financial records, each example financial record being associated with a transaction between a first entity and a second entity, and each example financial record having a first label identifying the first entity; for each example financial record of the set of financial records: determining a character string based on the financial record; determining one or more first substrings from the character string; generating a first match score for each of the one or more first substrings by comparing the one or more first substrings to the first label; determining a best match score based on the one or more first match scores; and responsive to the best match score exceeding a threshold match score, annotating the example financial record with an entity identifier, the entity identifier derived from the substring associated with the best match score; and determining a training dataset comprising the annotated example financial records.

The method may further comprise determining a position indictor for the substring associated with the best match score, wherein the entity identifier comprises the position indicator. In some embodiments, the entity identifier comprises the substring associated with the best match score.

Determining a best match score based on the one or more first match scores may comprise determining a highest first match score of the one or more first match scores as the best match score.

In some embodiments, the method further comprises: for each example financial record of the set of example financial records: determining one or more second substrings from the character string; generating a second match score for each of the one or more second substrings by comparing the one or more second substrings to the first label; determining a highest first match score of the one or more first match scores; and determining a highest second match score of the one or more second match scores; wherein determining the best match score based on the one or more first match scores comprises determining the best match score as the higher of the highest first match score and the highest second match score.

The one or more first substrings may be tokens. The one or more second substrings may be n-grams. The one or more first substrings may be n-grams.

In some embodiments, generating the first match score for each of the one or more substrings by comparing the one or more substrings to the first label comprises: determining a similarity score between the each of the one or more substrings and the first label using fuzzy matching.

Some embodiments relate to a method comprising: determining a training dataset comprising a plurality of examples, each example comprising a character string of a financial record, and a label entity identifier; for each of the plurality of examples: determining one or more first substrings from the character string of the financial record; providing the one or more first substrings to a numerical representation generation model to generate a numerical representation of the example; providing the numerical representation of the example and the respective label entity identifier to an entity prediction model; determining, as an output of the entity prediction model, a predicted entity identifier; comparing the predicted entity identifier with the respective label entity identifier; and determining one or more weights of the entity prediction model based on the comparison.

The method may further comprise determining one or more second substrings from the character string of the financial record; and providing the one or more second substrings to the numerical representation generation model to generate the numerical representation of the example. The one or more second substrings may be n-grams, such as bi-grams. The one or more first substrings may be tokens. The one or more first substrings may be n-grams.

In some embodiments, the training dataset is generated according to any one of the described methods.

Some embodiments relate to a method comprising: determining a candidate financial record associated with a transaction between a first entity and a second entity; determining one or more first substrings from a character string of the financial record; providing the one or more first substrings to a numerical representation generation model to generate a numerical representation of the candidate financial record; providing the numerical representation of the candidate financial record as an input to an entity prediction model; and determining, as an output of the entity prediction model, a predicted entity identifier.

The method may further comprise: determining one or more second substrings from the character string of the financial record; and providing the one or more second substrings to the numerical representation generation model to generate the numerical representation of the candidate financial record.

The method may further comprise: comparing the predicted entity identifier with a set of entity identifiers; and determining one or more suggested entity identifiers based on the comparison.

The entity prediction model may be trained using a training dataset comprising a plurality of examples, each example comprising a character string of a financial record and a label entity identifier. The label entity identifier may comprise an entity identifier substring extracted from the character string, and/or a label position indicator of the entity identifier substring within the character string of the financial record.

Some embodiments relate to a method comprising: determining a candidate financial record associated with a transaction between a first entity and a second entity; determining one or more first substrings from a character string of the financial record; providing the one or more first substrings to a numerical representation generation model to generate a numerical representation of the candidate financial record; providing the numerical representation of the candidate financial record as an input to an entity prediction model; and determining, as an output of the entity prediction model, a predicted entity identifier, wherein the entity prediction model is a multi-class classifier.

Some embodiments relate to a system comprising: one or more processors; and memory comprising computer executable instructions, which when executed by the one or more processors, cause the system to perform any one of the described methods.

Some embodiments relate to a computer-readable storage medium storing instructions that, when executed by a computer, cause the computer to perform any one of the described methods.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DESCRIPTION OF EMBODIMENTS

Figure 1:
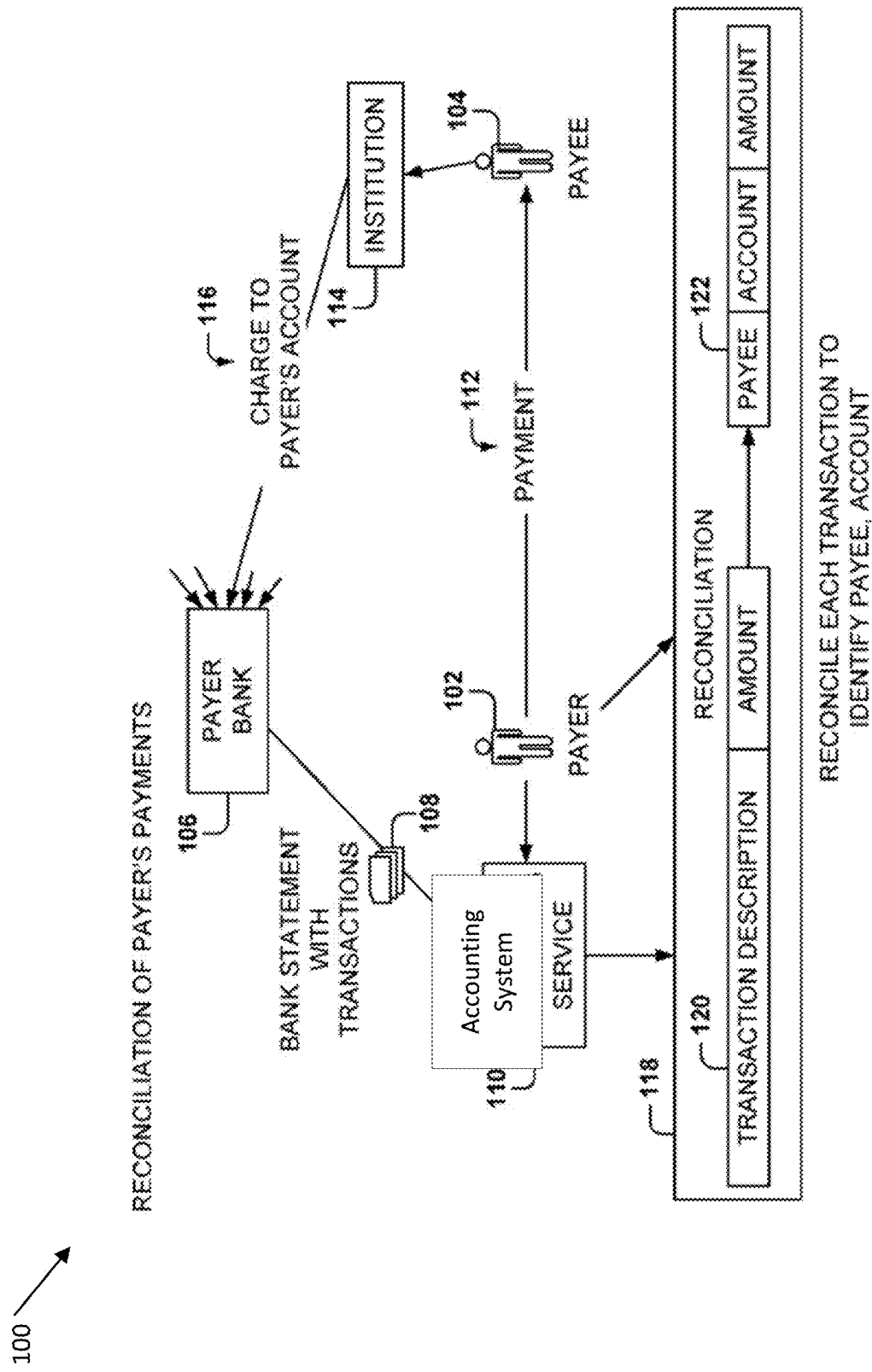
FIG. 1 is a diagram illustrating the reconciliation of a transaction, according to some embodiments.

Embodiments generally relate to computer-implemented methods, systems, and computer-readable storage medium or media for executing instructions for determining transactions attributes of financial records of transactions, and in some embodiments, to generate accounting records using the determined transaction attributes to allow for reconciliation of the financial record.

In some embodiments, a candidate financial record (such as a bank statement or a line item of a bank feed) associated with a transaction between a first entity (an accounting entity) and a second entity is received at an accounting system. Identity of the second entity may not be readily apparent based on the candidate financial record. The candidate financial record is converted into a numerical representation and provided to a transaction attribute prediction model to determine at least a first attribute associated with the transaction, such as an account code identifier and/or an entity identifier corresponding to the second entity. For example, the numerical representation may be generated by a numerical representation generation model that was trained on a corpus generated from historical financial records and optionally other financial data in an accounting database. The transaction attribute prediction model may be trained using a dataset of previously reconciled financial records, each associated with a respective first transaction attribute.

In some embodiments, the determined first transaction attribute may be used to reconcile the financial record, for example, to create and/or reconcile entries in a general ledger associated with the first entity and maintained by the accounting system. The first transaction attribute may be used to pre-populate a new accounting record to be created for reconciling with the financial record. The determined at least first transaction attribute may be presented to a user in a user interface of a reconciliation application, for example as a suggestion, and the user may indicate approval of the suggestion, and instigate the creation of the accounting record.

Some accounting systems allow for the extraction of transaction data, such as financial records, from financial systems, such as financial institution systems or banking systems, credit card payment systems, or other third-party payment systems. In some cases, financial records originating outside of an accounting system may be programmatically imported into the accounting system through one or more data integration processes. For example, banking systems may provide an Application Programming Interface (API) to allow accounting systems to securely extract transactions associated with one or more bank accounts of a business or entity. The APIs may be secured using authentication and encryption mechanisms and the extracted transaction data may be referred to as bank feed data. Bank feed data may comprise information regarding one or more transactions, including transaction data, a transaction amount, and/or text or data strings corresponding to a transaction reference, for example.

Accounting systems generally allow a business or entity to track its transactions in a structure suitable for financial reporting according to accounting practices and regulatory requirements. Accounting systems may also provide mechanisms for monitoring transaction data according to specific accounting categories or accounting codes. Accounting codes, which may also be referred to collectively as a chart of accounts, define various categories or indexes or names of accounts with which transactions may be associated. Example accounting codes include cash, accounts receivable, sales, and account payables. Accounting codes may also be assigned a unique accounting code number or an alphanumeric string. Businesses or entities may select predefined accounting codes from a library of accounting codes, and/or may create or define bespoke accounting codes to suit their particular financial reporting and tracking requirements. Business or entities may define accounting codes that may be tailored to their specific financial tracking or reporting needs. For example, an entity involved in trade of distinct product categories may define a distinct account code for revenues associated with each product category. Accordingly, different businesses or entities may have different charts of accounts tailored to their particular financial reporting needs.

By associating financial records of transactions with accounting codes, transactions can be categorised or labelled. The categorisation of financial records using accounting codes may assist in monitoring the performance of the entity, and/or for financial reporting. For example, the accounting system may allow a user to filter their transactions by accounting code to generate a subset of transactions that relate to specific transactions associated with distinct tax obligations.

The process of reconciliation of transactions using an accounting system involves associating a financial record received by the accounting system with an accounting record (for example, an entry in a general ledger) for the business, where the financial record and the accounting record relate to a common transaction. The accounting record may comprise information regarding a transaction, such as an accounting code, the name of a second entity associated with the transaction and other attributes associated with the transaction. In some circumstances, an accounting record may be created before the transaction occurs in the real world. For example, an accounting record, such as an invoice, may be generated using the accounting system and sent to a customer. Once the customer makes a payment, the accounting system receives a financial record associated with the transaction. The financial record then needs to be reconciled, ideally with the accounting record associated with the transaction.

However, in some situations, a financial record may be received before or without any corresponding accounting record having been generated. For example, a business may have made a payment for some business expenses without creating an accounting record. In these cases, when the financial record is received at the accounting system, an accounting record should be created in order to reconcile the transaction. Creating accounting records can be an arduous and time-consuming process as the information in the financial record may not be sufficiently particularised for humans or automated processes to identify the various attributes associated with the transaction, including an account code and/or or a second entity associated with the transaction, for example.

Described embodiments provide methods and systems for determining attributes related to financial transactions to allow the creation and/or population of accounting records in an accounting system for reconciling with the financial transactions.

A transaction attribute prediction model, such as a machine learning model, is configured or trained to determine attribute(s) of or associated with financial transactions. The transaction attribute prediction model may have been trained using a dataset of previously reconciled financial records of one or more entities, each reconciled financial record being associated with attribute(s). For example, the transaction attribute prediction model may be trained on previously reconciled financial records for a plurality of entities having account records maintained by the accounting system. The transaction attribute prediction model may therefore be considered to be a generic or common model, that is common to a plurality of different first entities as opposed to tailored for a specific entity, and suitable for use by a wide variety of entities despite differences in the way each entity may manage their financial data, for example, differences in charts of accounts used by entities.

Accordingly, the transaction attribute prediction model provides for accurate determinations of transaction attribute(s) relevant to a specific entity while avoiding the need for training and managing distinct or entity specific models for each entity. Further, improvements made to the transaction attribute prediction model are shared across all entities relying on the common model so that all such entities benefit from the improvements. Insights derived by the transaction attribute prediction model from the activity of one entity or a group of entities may also be advantageously used to provide more accurate determinations to an unrelated entity or unrelated groups of entities. Accordingly, the transaction attribute prediction model forms part of a more computationally efficient method and system for determining transaction attributes related to financial records.

A further advantage of the transaction attribute prediction model relates to entities that have limited historical data in the accounting system. Entities that are new to the accounting system may not have sufficient historical data to allow the common model to draw inferences based on their particular historical data. This may be described as a 'cold start' problem. However, as the transaction attribute prediction model may be trained on historical reconciliation data associated with a wide variety of other entities that may perform similar transactions, the transaction attribute prediction model is capable of determining relevant attribute(s) of financial records for new entities to the accounting system. As the new entity continues to use the accounting system and creates its own historical reconciliation data, the transaction attribute prediction model may incorporate knowledge from the historical reconciliation data of the new entity in subsequent training iterations. Therefore, the transaction attribute prediction model provides meaningful attribute determinations and/or recommendations to entities new to the accounting system, while progressively learning from the historical reconciliation data generated by the new entity.

Some embodiments relate to an automatic approach for generating a training dataset for training a transaction attribute prediction model, such as entity prediction model, to determine attribute(s) (such as entity identifiers) of or associated with financial transactions. With financial records, it can be the case that a named entity within a section of text, for example a statement line of a financial record, does not correspond with or relate to a contact or entity identifier with which the financial record gets reconciled. Accordingly, reconciled financial records that include a label identifying an entity with which the financial record had been reconciled may not be suitable or sufficient for using to train the entity prediction model. Described embodiments relate to generating a training dataset including examples comprising a character string of a financial record, a label entity identifier (substring) extracted from the character string, and label start and end indices of the entity identifier within the character string of the financial record. Such an approach may provide distinct advantages in terms of time, cost and/or consistency in the generation of training datasets, and may lead to an improved, better performing trained entity prediction model.

FIG. 1 is a schematic diagram illustrating a method 100 of reconciling transactions, according to some example embodiments. In accounting, reconciliation is the process of ensuring that two sets of records (e.g., the balances of two accounts) are in agreement. For example, reconciliation is used to ensure that the transfer of money from a bank account corresponds to a specific expense for the business. Reconciliation includes matching financial records, such as the entries in a bank statement or line items in a bank feed, to one or more accounting records in the general ledger of a business. In the example illustrated in FIG. 1, a payer 102 sends a payment 112 to a payee 104. In some cases, the payment is associated with an invoice sent by the payee 104, and at other times the payment is not associated with a predefined accounting record in the general ledger of an associated business of the payer 102.

The payee remits the payment 112 to a financial institution 114 (e.g., bank or credit card company) to charge 116 the payer's account associated with the payer's bank 106, which receives charges from a plurality of sources. The financial institution 114 then includes the payment as an entry in the bank statement 108 sent to the payer 102 or to an accounting system 110. In some embodiments, the payer 102 or the accounting system 110 may be equipped to receive financial information including bank statement entries in the form of a bank feed, as discussed in more detail below.

During reconciliation 118, for each transaction 120 the payer 102 has to identify the transaction description and amount to identify the accounting data 122, which may include the corresponding payee, the account or account code in the accounting system, the amount in the accounting system, and/or other attributes, such as tax rate, tax amount, and the like. Sometimes, there may already be a corresponding entry in the accounting system, but at other times a new entry may need to be created based on each transaction 120.

Often, the challenge is to reconcile the entry based on a short or cryptic description in the bank statement, which may make reconciling a long and tedious process where mistakes may take place. The goal of the accounting service is to make reconciliation an easy task (for example, by offering suggestions to the user based on the bank statement). For example, the amount may be a good indicator for generating suggestions by matching the amount to an entry in the accounting system. However, matching based on the amount may not always work because there may not be an entry in the accounting system yet or because the payer may consolidate multiple payments into one single cheque. While some times the name of the payee may be included in the statement, many times the name of the payee is not included, and instead, there is a description of the service, such as "Taxi Service" or "Entertainment." These are some of the reasons why performing automatic reconciliation of transaction data in bank statements in the accounting system may be difficult and manual reconciliation is often required. Some solutions for reconciliation are based on defining rules for reconciliation, such as, "If the entry includes 'taxi' then the account is 2547 and add new accounting entry." However, rules are difficult for reconciling a large number and variety of transaction data records being generated by heterogeneous financial systems. Similarly, different businesses typically have different charts of accounts, making generalising such rules particularly challenging.

Figure 2:
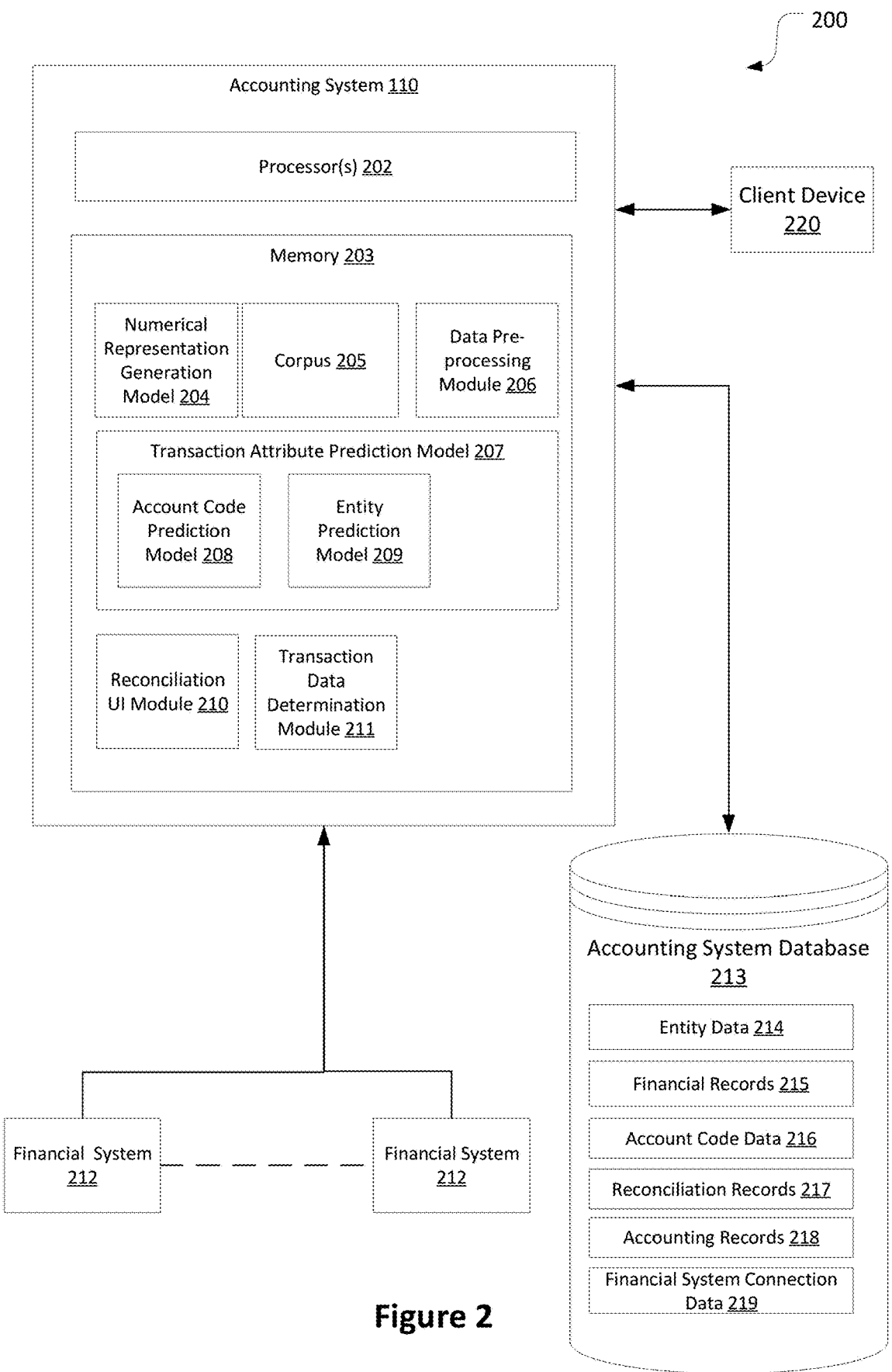
FIG. 2 is a block diagram of a system for transaction data processing, according to some embodiments.

FIG. 2 illustrates a block diagram of a system 200 for transaction data processing, according to some embodiments. The system 200 comprises an accounting system 110, which includes the hardware and software necessary to provide accounting software or an accounting software service. In some embodiments, accounting software or an accounting software service provided by the accounting system 110 may be accessible to a client device via a communications network, such as the Internet. The accounting system 110 may provide centralised web-based accounting software to a large number of business or individuals. The accounting system 110 may be accessible by business or individuals using the client device 220 and an internet connection to the accounting system 110. The client device 220 may be an end-user computing device such as a desktop computer, a laptop computer, a mobile device or a tablet device for example.

The accounting system 110 comprises at least one processor 202 and memory 203. The processor 202 may include an integrated electronic circuit that performs the calculations such as a microprocessor, graphic processing unit, for example. Memory 203 may comprise both volatile and non-volatile memory for storing executable program code, or data. In some embodiments, the accounting system 110 may be implemented as a distributed system comprising multiple server systems configured to communicate over a network to provide the functionality of the accounting system 110.

Memory 203 comprises program code which when executed by the processor 202 provides the various computational and data management capabilities of the accounting system 110. The block diagram of FIG. 2 illustrates some of the modules stored in memory 203, which when executed by the processor(s) 202 to provide the transaction processing capabilities of the accounting system 110.

Memory 203 comprises a numerical representation generation model 204. The numerical representation generation model 204 comprises program code which, when executed by the processor(s) 202, causes the accounting system 110 to process transaction data and generate numerical representations of the transaction data. In some embodiments, the numerical representation generation model 204 may generate the numerical representations using a neural network trained to generate word embeddings or vectors corresponding to each token in the transaction data. In some embodiments, the numerical representation generation model 204 may incorporate one or more language models such as the Bidirectional Encoder Representations from Transformers (BERT) language model.

Transaction data may comprise financial records, such as data from bank statements and/or bank feeds, and/or may comprise accounting or bookkeeping data, as maintained by the accounting system for a plurality of entities. In some embodiments, the numerical representation generation model 204 may also generate numerical representations of account code data 216 and/or entity data 214. Account code data 216 may comprise an account code identifier such as an account code name and/or an account code number. Entity data 214 may comprise information relating to entities including entity name, entity type, entity industry, a country the entity operates in, for example.

Transaction data, account code data 216 and/or entity data 214 comprises one or more elements or data strings that are comprehensible by humans. For example, each data string may comprise one or more characters, which may be numbers, letters or other non-alphanumeric characters such as /, %, $, # etc. However, to perform various transaction data processing steps, in particular, transaction data processing steps that involve natural language processing, a numerical representation of the data strings of the transaction data, account code data and/or entity data is required. The numerical representation generation model 204 generates numerical representations of transaction data and/or account code data and/or entity data to allow the computational operation of the various natural language processing tasks performed by the accounting system 110.

In some embodiments, the numerical representations may be generated using a corpus of words or data strings 205 extracted from documents and/or records stored in an accounting system database 213 accessible to the accounting system 110. For example, the documents and/or records used to generate the corpus 205 may comprise transaction data, financial and/or accounting record data, account code data, and/or entity data.

Memory 203 may comprise a data pre-processing module 206 including program code which, when executed by the processor(s) 202, causes the accounting system 110 to perform data pre-processing to improve the efficiency and/or accuracy of the transaction data processing operations performed by the accounting system 110. Pre-processing operations may include operations that are performed on financial records received by the accounting system 110 from the financial system 212. Pre-processing operations may include removal of semantically irrelevant characters or strings in financial records. Semantically irrelevant characters or strings include characters or strings that do not have meaningful information relevant to account code determination or entity name determination. For example, financial records comprising a long sequence of numbers may be removed from the financial records during pre-processing.

Pre-processing of financial records may also include replacement of a pre-defined pattern of characters or strings with a pre-defined replacement token that better captures the semantic meaning of the replaced pre-defined pattern of characters or strings. The pre-defined pattern of characters or strings for replacement may be identified using one or more regular expressions provided in the pre-processing module 206.

One example of pre-processing operation relates to financial records comprising credit card numbers. The specific credit card number may not include relevant information to assist in account code or entity determination. Pre-processing of financial records including credit card numbers may include replacing the credit card numbers with a replacement toked such as '<CC_NUM>'. By performing this replacement, the general information regarding the presence of a credit card number is captured, while the specific information relating to a particular credit card number is removed to improve the overall accuracy of the transaction attribute determination. Another example or a pre-processing operation includes replacement of end of line characters in financial records with a replacement token such as '<END_OF_LINE>.'

The replacement of a pre-defined pattern of characters or strings with a pre-defined replacement token brings about greater consistency in financial records originating from distinct sources and improves the performance and accuracy of the account code and entity name determination operations by the transaction attribute prediction model 207.

Memory 203 further comprises a transaction attribution prediction model 207. The transaction attribution prediction model 207 comprises program code which, when executed by the processor(s) 202, causes the accounting system 110 to process transaction data and/or other data stored in the accounting system database 213 to identify one or more attributes related to transaction data, and in some embodiments, specifically to identify one or more attributes related to a financial record, such as an account code identifier and/or one or more entities associated with the transaction to which the financial record relates. In some embodiments, the transaction attribution prediction model 207 may comprise an account code prediction model 208 for predicting an account code identifier associated with a financial record. In some embodiments, the transaction attribution prediction model 207 may comprise an entity prediction module 209 for predicting one or more entities associated with the financial record.

Memory 203 may also comprise a reconciliation user interface module 210 to present predicted or determined transaction-related attributes to a user and receive user input in response to the predicted transaction-related attributes, such as approval of the determined transaction-related attributes and/or the approval of the association of an accounting record generated with the determined transaction-related attributes with the financial record. The reconciliation user interface module 210 may be part of a web application module (not shown) configured to make the accounting software interface available to the client device 220.

The accounting system database 213 comprises data used by the accounting system 55 to provide the accounting software services, including the accounting data of users of the accounting service. The accounting system database 213 may be implemented using a relational database or a non-relational database or a combination of a relational database and a NoSQL database. The accounting system database 213 may be implemented as a distributed system to meet the scalability requirements of the accounting system 200.

The accounting system database 213 may comprise entity data 214, financial records 215, account code data 216, reconciliation records 217, accounting records 218, and/or financial system connection data 219. At least some of the records in the accounting system database 213 are specific to a particular business or entity, and each business or entity using the accounting system 110 has access to data and/or records relating to its own business. Entity data 214 may comprise data regarding other business or individuals or entities or contacts that a specific business or entity may transact with. Entity data 214 may comprise name or an entity, contact details such as email and/or phone numbers, a physical address, a web address, entity identification numbers such as a company number, for example. Each entity record may correspond to a real word entity, business or individual that a business may perform transactions with.

Financial records 215 comprise records relating to a transaction performed by an entity, or between and first and second entity. Financial records 215 may include a credit transaction, a debit transaction or a transfer within two bank accounts of the business, for example. Financial records 215 may be generated by one or more financial systems 212 external to the accounting system 110. The financial system 212 may include banking systems, credit card systems, online payment systems, cryptocurrency payment systems or any other system that enables payment of any kind from one individual or entity to another individual or entity.

Memory 203 of the accounting system 110 comprises a transaction data determination module 211. The transaction data determination module 211 comprises program code to extract transaction data from one or more financial systems 212. In some embodiments, entities, such as businesses, using the accounting system 200 may configure the accounting system 110 to periodically, or aperiodically, request or extract transaction data from one or more financial systems 212 and store the extracted transaction data as financial records 215 in the accounting system database 213. The extraction of the financial records may be facilitated using financial system connection data 219 stored in the accounting system database 213. The financial system connection data 219 may comprise bank account details, connection credentials and other data necessary to configure the accounting system 110 queries and extract transaction data specific to a business from the external financial system 212. A business may use several bank accounts or financial systems for sending or receiving payments by configuring the accounting system 110 to extract transaction data from the financial systems 212 and store the data as financial records 215 in the accounting system database 213. Each determined financial record 215 may be reconciled by allocating to the financial record 215, an account code identifier and associating it with at least one entity.

The account code data 216 comprises definitions of account codes for a specific business or entity. A business may define a set of its own account codes or it may use a set of standardised account codes or a combination of both. Each account code record may comprise information including an account code name (for example, Accounts Payable, Accounts Receivable), a unique account code or number (for example, 800, 610), an account type designation (for example, current liability, fixed asset, equity, depreciation), an account code description (for example, 'Outstanding invoices the company has received from suppliers but has not yet paid at balance date'), and/or account code tax category or designation (for example, 'GST Free Expense' or 'GST on Income').

Reconciliation records 217 may be created when a transaction record 215 is reconciled with an accounting record 218 (pre-existing or newly created), or in some embodiments, when a financial record is associated with an account code and/or an entity. For example, as financial records 215 are received from the financial systems 212, the financial record may be reconciled by allocating a specific account code from the account code data 216 and/or associating at least one entity from the entity data 214 to the financial record. The reconciliation record 217 may comprise the information regarding the specific account code from the account code data 216 and the associated entit(ies) from the entity data 214 used to reconcile a specific financial record. In some embodiments, an accounting record 218 associated with a financial record 215 may be created based on the reconciliation record 217 and the allocated specific account code from the accounting records 218 and associated entity from the entity data 214.

Accounting records 218 may comprise records regarding transaction-related documents created by a business using the accounting system 200. Accounting records may include bills, invoices, receipts, for example. In some embodiments, the reconciliation records may also comprise a reference to a specific accounting record 218 associated with a transaction.

Figure 3:
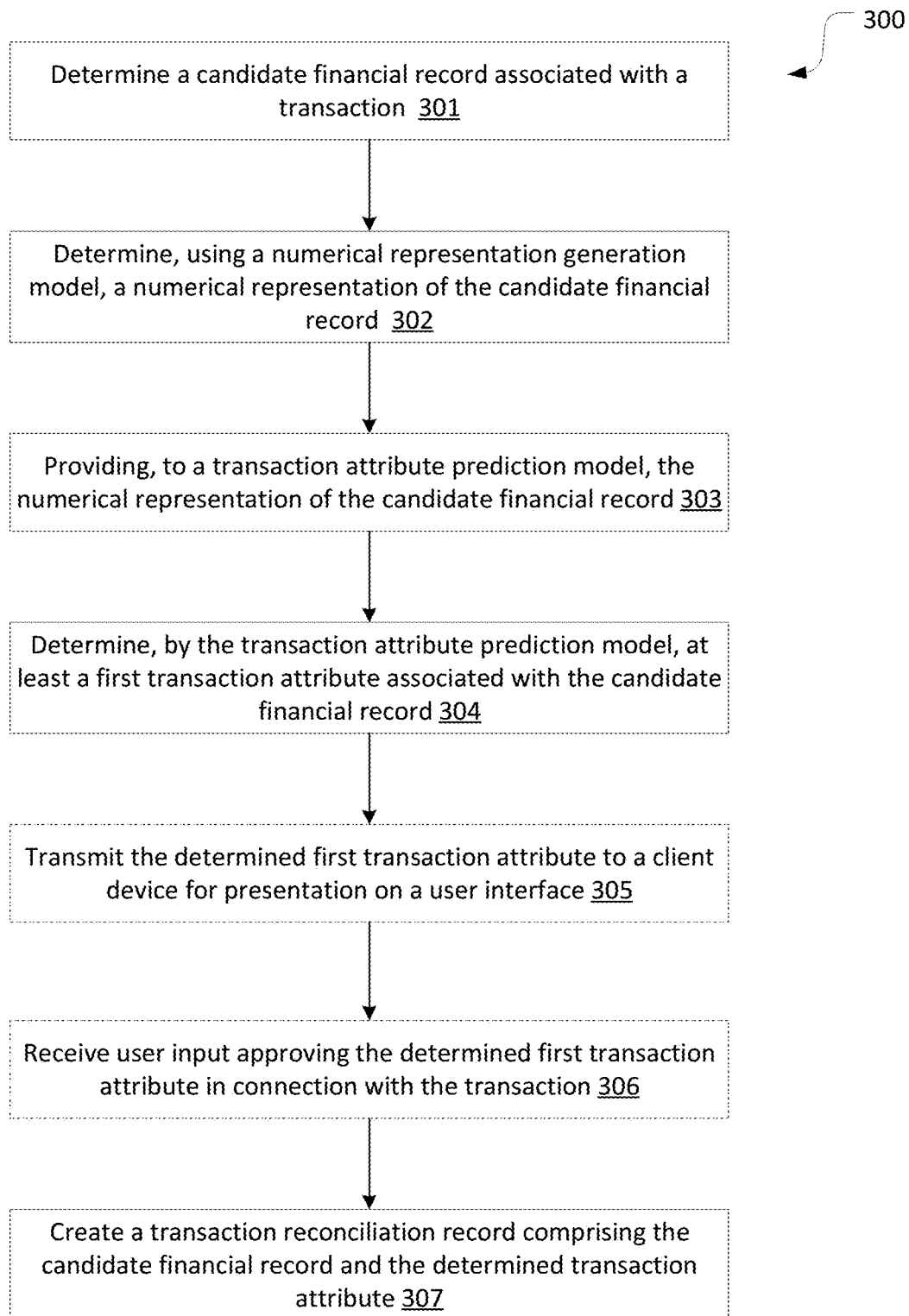
FIG. 3 is a process flow diagram of a process for transaction data processing, according to some embodiments.

FIG. 3 is a process flow diagram of a method 300 for determining transaction attributes, according to some embodiment. The method 300 may be performed by the processor(s) 202 of the accounting system 110 executing the modules and/or models stored in memory 203.

At 301, the accounting system 110 determines a candidate financial record associated with a transaction, such as a transaction between a first entity and a second entity. The transaction data determination module 211 of the accounting system 110 receives the candidate financial record from one or more financial systems 212, or from a client device 220. In some embodiments, the transaction data determination module 211 may be configured to extract financial records according to a predefined schedule, for example once every 24 hours, or once every 12 hours, or once every 6 hours, or sporadically. In some embodiments, the determined financial records may be stored in the accounting system database 213. For example, the transaction data determination module 211 may use financial system connection data 219 stored in the accounting system database 213. The financial system connection data 219 may comprise access credentials or information to allow the accounting system 110 to establish a communication link with financial system 212 over the network. The access credentials or information may include a financial system identifier (such as the name of a bank), a bank account number, and access credentials such as a password, for example.

Where multiple financial records are received as financial data, the transaction data determination module 211 may process the financial data to determine or extract individual financial records. Each determined financial record may include one or more attributes such as transaction data, payee details, a reference, a description, a transaction amount, transaction currency, and/or transaction type detail.

The attributes, and/or formatting of financial records may depend on the source of origin of the financial data. For example, different financial systems 212 may generate financial records with distinct attributes and/or formats specific to the financial system 212. In some embodiments, the transaction data determination module 211 applies a financial system specific data mapping schema or rules set to harmonise or normalise transaction data extracted from distinct transaction data sources. In some embodiments, regardless of the financial system from where the financial record originated, the transaction data determination module 211 may format data or character strings of the financial record, for example, to remove any predefined "special" characters, such as %, ?, /, to harmonise the type or case of letter, and/or to split alphanumeric data strings into separate strings of numbers and letters. The financial records may include truncated, merged or abbreviated strings and/or strings that are not natural language strings or strings that are not capable of being readily interpreted by a human. The numerical representation generation module 204 is configured to process the truncated, merged or abbreviated strings and/or strings that are not natural language strings or strings that are not capable of being readily interpreted by a human to produce a numerical representation that captures a semantic meaning of the truncated, merged or abbreviated strings and is suitable for computational operations by the transaction attribute prediction model 207.

At 302, the numerical representation generation model 204 of the accounting system 301 determines a numerical representation of the candidate financial record (or a numerical representation of a pre-processed or formatted version of the candidate financial record). In some embodiments, the candidate financial record may be pre-processed by the data pre-processing module 206 before a numerical representation of the candidate financial record is determined. The pre-processing operations may include extraction of a part of the candidate financial record by discarding parts of the candidate financial comprising strings or characters not relevant for transaction attribute determination. The parts of the candidate financial comprising strings or characters not relevant for transaction attribute determination may be identified using one or more predefined irrelevant string patterns stored in the data pre-processing module 206. The numerical representation generation model 204 is trained using the corpus 205 generated from historical transaction records, as discussed below.

In some embodiments, the accounting system 301 determines a numerical representation of a combination of the candidate financial record and other accounting entity attributes, such as entity type, an industry the accounting entity is related to and a country the entity operates in, i.e., entity geography. By incorporating this additional information into the numerical representation, the numerical representation is more informative, and may allow for improved attribute recommendations to be predicted by the transaction attribute prediction model 207. It will be appreciated that where this embodiment is followed, the transaction attribute prediction model 207 will similarly have been trained on training data that comprises combinations of previous financial records and associated entity attributes.

In some embodiments, the numerical representation generation model 204 of the accounting system 301 determines a numerical representation of accounting entity specified first attributes, the numerical representation generation model having been trained using the corpus 205 generated from historical transaction records. For example, in embodiments where an accounting entity or user has defined its own account codes, that may be unique or specific to the accounting entity (and as may be stored in the account code data 216), the transaction attribute prediction model 207 may be configured to determine which one or more of those accounting entity defined first attributes to recommend to the user for reconciling the candidate financial transaction. To that end, numerical representations of the accounting entity specified first attributes may be provided to the transaction attribute prediction model along with the numerical representations of the candidate financial record. It will be appreciated, however, an accounting entity may use a mix or combination of accounting entity defined first attributes and accounting system predefined first attributes.

In some embodiments, the numerical representation of the first attributes may be predetermined by the numerical representation generation model 204 and stored (for example, in account code data 216 or entity data 214) for retrieval by the transaction attribute prediction model 207 as required to determine at least a first transaction attribute associated with the candidate financial record. In some embodiments, the numerical representation generation model 204 may determine one or more of the numerical representations of the first attributes when the method 300 is instigated.

At 303, the numerical representation of the candidate financial record is provided to the transaction attribute prediction model 207. At 304, the transaction attribute prediction model 207 determines at least a first transaction attribute associated with the candidate financial record. For example, the first attributes or multiple attributes may be an account code name or an account code number or the other entity associated with the transaction. The transaction attribute prediction model 207 may determine multiple different transaction attributes. The transaction attribute prediction model 207 may be trained using a dataset of previously reconciled financial records, each associated with a respective at least first transaction attribute. In some embodiments, the previously reconciled financial records of the training dataset may each be associated with multiple distinct transaction attributes. The training of the transaction attribute prediction model 207 is discussed below in more detail with reference to FIGS. 5 and 6.

For example, in some embodiments, the transaction attribute prediction model 207 comprises an entity prediction model 209 configured to process the candidate financial record to identify one or more entities related to the candidate financial record, which may be offered as suggestions or recommendations for reconciling the candidate financial record. The entity prediction model 209 may be trained using previously reconciled financial records as inputs and associated entity data as outputs or labels. The one or more entities identified may be from among a set of entity data predefined by an accounting entity or business. The one or more entities identified may be entities new to the business and with which the business may not have previously transacted. Such new businesses or entities may however be entities with which other accounting entities of the accounting system have conducted business. In some embodiments, the entity prediction model 209 may also determine a confidence score associated with each predicted entity. The confidence score may represent a degree of certainty associated with the predicted entry. Training of the entity prediction model 209 is described in more detail below with reference to FIG. 8. The entity prediction models may be based on the entity recognition models of the spaCy or Stanza or FLAIR natural language processing frameworks.

In some embodiments, the transaction attribute prediction model 207 comprises an account code prediction model 208 configured to process the candidate financial record to determine one or more account code suggestions or recommendations for reconciling the candidate financial record. The account code prediction model 208 is trained using reconciled financial records as inputs to the model and account codes associated with the reconciled transaction data as outputs or labels. In some embodiments, the account code prediction model 208 may include a feedforward neural network, or a convolutional neural network, or a recurrent neural network or a transformer based neural network to process the candidate financial record. In some embodiments, the account code prediction model 208 may generate a confidence score associated with each account code recommendation. In some embodiments, the recommended account code may be one of an accounting entity defined account codes, and/or may be one of an accounting system predefined account codes (such as generic accounting codes provided by the accounting system as options for users). In some embodiments, the recommended account code may not be a predefined account code for a specific entity and may be new to the specific entity, but not new to one or more other entities having accounts maintained by the accounting system (i.e. the account code may have been one used in a previously reconciled transaction which was used to train the transaction attribute prediction model). The account code new to a first entity may be generated in response to a transaction in a category that the entity has not previously undertaken. For example, an accounting entity may not have created an account code for interest income. When the account code prediction model 208 suggests the account code "interest income" for a candidate financial record, where the accounting entity does not have that account code in its list of associated account codes, the account code prediction model 208 may recommend that the accounting entity add the new account code to its list of associated account codes.

In some embodiments, the account code prediction model 208 is configured to iterate through each numerical representation of the account codes and determine a similarity measure or a confidence score by comparing pairs of the numerical representation of the candidate financial records and ones of the numerical representations of account codes with the numerical representations generated for the transaction data and associated account codes during training. The similarity measure or a confidence score may be determined using any one of cosine similarity, Euclidean distance, logistic regression, gradient boosting machine, or a trained neural network. In some embodiments, a neural network, a feedforward neural network, or a convolutional neural network, or a recurrent neural network, or a transformer-based neural network may be used to determine the similarity measure or the confidence score. Some embodiments may comprise a feedforward neural network trained to determine a similarity measure or a confidence score indicating the suitability of an account code for a specific financial record. The feedforward neural network of some embodiments may comprise 2, 3 or 4 layers of neural networks for example. The feedforward neural network of some embodiments may incorporate a rectified linear activation function in an activation layer. The training of the feedforward neural network may be performed using a categorical cross-entropy loss function in some embodiments. During the training of the feedforward neural network, in some embodiments, an initial learning rate of 0.001 may be used for example. The learning rate may be decremented using a learning rate decay value of 0.2 every 2, 4 or 6 training epochs in some embodiments.

Figure 7:
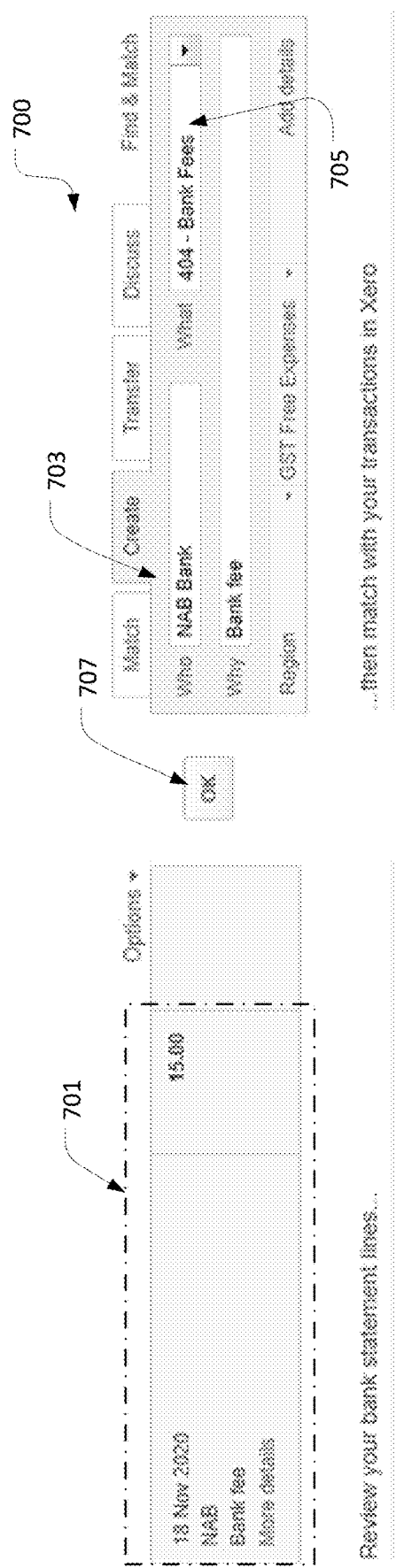
FIG. 7 is a screenshot of interface for reconciling a transaction, according to some embodiments.

In some embodiments, at 305, the accounting system 110 may provide the determined at least one first transaction attribute associated with the candidate financial record to a client device for presentation on a user interface, such as a user interface associated with a reconciliation application. This may occur, for example, when a designated user from a business logs on to the accounting software and navigates to a reconciliation user interface presented by the reconciliation UI module 210. FIG. 7, illustrates an example of a reconciliation user interface according to some embodiments. In addition to the first transaction attribute(s) presented on the user interface, a confidence score for each first transaction attribute may be transmitted for the presentation of a display on the user interface of the client device 220.

At 306, the accounting system 110 may receive an input from the client device 220 in response to the presented recommendation(s). The input may comprise an indication of approval or of a selection of a first and further attributes (for example, an account code recommendation and/or entity name recommendation for the financial record. In embodiments, where more than one account code and entity name is predicted and recommended to the user for a particular financial record, then the received user input may comprise a designation of a specific one of the recommended account codes and entity names.

At 307, the accounting system 110 may create a reconciliation record relating or associating the candidate financial record with the selected or approved attribute(s).

In some embodiments, steps 305 and 306 are optional and step 307 of creating a reconciliation record may be performed automatically based on confidence scores associated with determined transaction attributes. For example, the accounting system 110 may be configured to determine a confidence score associated with an entity name and/or account code recommendation and responsive to the confidence score meeting a threshold value, the accounting system 110 may automatically create the reconciliation record, without any need for user input.

The numerical representation generation model 204 is configured to determine a numerical representations of inputs, such as candidate financial records, reconciled financial records and other transaction data, including accounting codes, entity names relating to transactions, and other entity attribute information such as entity type, entity geography and/or entity industry.

The numerical representation generation model 204 may be configured to generate a numerical representation in the form of a vector using a vectorisation technique suitable for natural language processing tasks. In some embodiments, vectorisation may be performed using a corpus 205 of words or strings obtained from historical transaction records stored in the accounting system database 213.

Machine learning algorithms operate on a numeric feature space, expecting input as a two-dimensional array where rows may be instances and columns may be features. To perform machine learning on select data, the select data is converted into vector representations so that it is suitable for numeric machine learning. This process may be referred to as feature extraction or vectorization. The vectorisation process transforms the relevant data and records in the accounting system database 213 from a sequence of words or characters to points that occupy a high-dimensional semantic space. Points in space can be close together or far apart, tightly clustered or evenly distributed. Semantic space is therefore mapped in such a way where data or records that are similar are closer together and those that are different are farther apart. By encoding similarity as distance, the numerical representation generation model 204 derives the primary components of the data and enables decision boundaries to be drawn in the semantic space.

In some embodiments, the numerical representation generation model 204 uses one-hot encoding to generate the numerical representation. The numerical representation produced using one-hot encoding may be in the form of a sparse vector with a positive value corresponding to only the feature or word present in a transaction record.

In some embodiments, the numerical representation generation model 204 uses a term frequency-inverse document frequency (TF-IDF) technique to generate the transaction data. The TF-IDF technique takes into account the relative frequency or rareness of tokens or words in a transaction record against their frequency in all or a large set of transaction records stored in the accounting system database 213. The TF-IDF technique is based on the principle that the most meaningful information of a financial record is most likely encoded in the more rare terms used in the financial record. TF-IDF based vectorisation normalizes the frequency of words or tokens in a financial record with respect to the rest of the corpus determined from financial records stored in the accounting system database 213. TF-IDF is computed on a per-token or per-word basis, such that the relevance of a token to a financial record is measured by the scaled frequency of the appearance of the token in the financial record, normalized by the inverse of the scaled frequency of the term in a larger corpus of financial records obtained from the accounting system database 213.

In some embodiments, the numerical representation generation model 204 uses a word embedding based technique to generate the numerical representation of transaction data such as financial records. A word embedding is a learned representation for text where words or characters that have the same meaning have a similar representation. Word embeddings include a class of techniques where a financial record is represented as a numerical representation in the form of a real-valued vector in a predefined vector space.

Each financial record may be mapped to one vector. Transforming financial records into numerical representations using word embeddings allows mathematical operations to be performed on the numerical representations. The mathematical operations may include determination of a similarity or relatedness metric for two vectors. The similarity or relatedness metric may indicate how semantically similar two vectors are. The similarity or relatedness metric may be determined using any one the techniques of cosine similarity, Euclidean distance, logistic regression, gradient boosting machine, or a trained neural network, for example.

In some embodiments, a trained neural network may be used to generate the word embeddings. The neural network for generating the word embeddings may be trained based on the feedback generated using historically reconciled financial records in the accounting system database 213. The feedback may be generated by using a loss function such as a categorical cross-entropy loss function.

In some embodiments, data to be vectorised, such as the financial records, account codes, entity names and/or entity attributes, may comprise multiple data strings or words and the numerical representation of the entire data may be generated using an average of each character or word or token of the data. In some embodiments, 32, 64 or 128 dimensions may be selected for the numerical representation of data.

Figure 4:
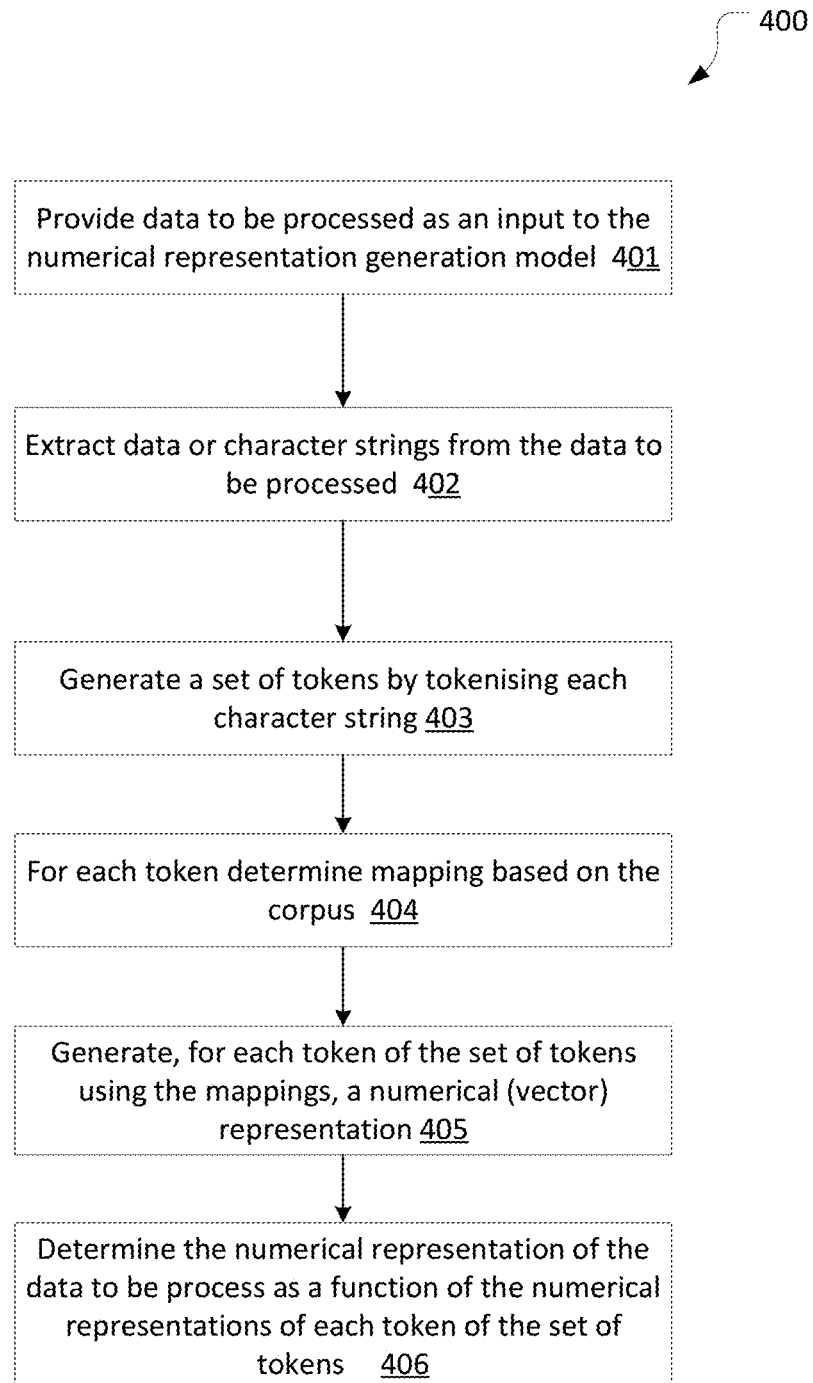
FIG. 4 is a process flow diagram of a method for determining a numerical representation of data, according to some embodiments.

FIG. 4 is a process flow diagram of a method 400 for determining a numerical representation of data, such as a financial record, according to some embodiments. In some embodiments, step 302 of method 300 is performed according to method 400.

In some embodiments, the numerical representation generation model 204 may generate numerical representations based on the principles of distributional semantics. Distributional semantics are techniques for quantifying and categorizing semantic similarities between items based on their distributional properties in large samples of data. In the context of processing financial records, the numerical representation generation model 204 may be trained using data derived from financial records 215 accessible to the accounting system 110. However, it will be appreciated that the numerical representation generation model 204 may be trained using transaction data and/or entity data available to the accounting system 110.

The numerical representation generation model 204 may be trained to determine proximate occurrence statistics for each word or character strings in the corpus 205 defined using a dataset of transaction relevant data, such as the financial records 215. The proximate occurrence statistics may be represented in the form of a co-occurrence matrix. The co-occurrence matrix tabulates how frequently words or character strings co-occur with each other in the corpus 205 defined using the financial records 215. Based on the co-occurrence matrix, a numerical representation generation model 204 may be trained on unrelated tasks, that is, a task not directly related to the task of generating numerical representations. The unrelated tasks may include, for example, determining a next word in a series of words or a missing word between a series of words based on the co-occurrence matrix. In some embodiments, the numerical representation generation model 204 may use a GloVe: Global Vectors for Word Representation based model for generating numerical representations. In some embodiments, the numerical representation generation model 204 may use a word2vec based model for generating numerical representations.

At 401, data to be processed is provided to the numerical representation generation model 204. For example, the data to be processed may comprise transaction data, such as financial records, entity names, account codes, entity attribute data, such as entity type, entity geography, and/or entity industry, for example. Any of this data may be taken alone, or in combination with other data. For example, and as previously explained, the numerical representation generation model 204 may be configured to vectorize a combination of data from a financial record and accounting entity data, such as entity type, entity geography, and/or entity industry.

At 402, the numerical representation generation model 204 extracts data or character strings from the data to be processed. In some embodiments, the numerical representation generation model 204 extracts information or character strings associated with specific attributes from the data. For example, in some embodiments, the specific attributes may include one or a combination of payee data, transaction reference, or transaction notes. The specific attributes may vary depending on the source of the financial record being processed by the numerical representation generation model 204. In some embodiments, to harmonize the financial records being extracted from the various financial systems 212, the transaction data determination module 211 may comprise a financial systems specific mapping identifying relevant fields or attributes in the financial records received from each financial system 212. The financial system specific mapping allows for a certain degree of harmonization of the financial records generated by disparate financial systems 212.

At 403, the numerical representation generation model 204 generates a set of tokens by tokenising each character string. In some embodiments, tokenization may include extracting specific or distinct words from character strings associated with specific attributes based on spacing or separator characters between individual words or characters in each of the relevant attributes fields.

At 404, for each token identified at 403, a mapping is determined based on the corpus 205. The mapping may be determined using one or more feature hashing techniques to transform a token into a hashed mapping vector using a custom hash function. The feature hashing technique may comprise a definition of the custom hash function based on the corpus 205. For example, the custom hash function may be defined using the principles described in the paper 'Feature Hashing for Large Scale Multitask Learning' by Weinberger et al., CML '09: Proceedings of the 26th Annual International Conference on Machine Learning June 2009 Pages 1113-1120, https://doi.org/10.1145/1553374.1553516.

At 405, for each token of the set of tokens, the numerical representation generation model 204 generates a numerical representation or a word embedding based on the hashed mapping vectors determined at 404. For example, the numerical representation generation model 204 may comprise a neural network trained to generate the numerical representation in accordance with the method 500 described below with reference to FIG. 5. The numerical representation may be in the form of a high dimensional vector, such as a 32 dimension, or a 64 dimension or a 128 dimension vector for example.

At 406, the numerical representation generation model 204 determines the numerical representation of the data to be processed (for example, the candidate financial record) as a function of the numerical representations of each token of the set of tokens. In some embodiments, the numerical representation generation model 204 may determine the numerical representation of the data to be processed by determining an average of the numerical representations of each token of the set of tokens. Averaging of the numerical representations may include a summation of each dimension of the vectors representing each tokenized word of the financial record (or other data) and division by the total number of vectors.

Figure 5:
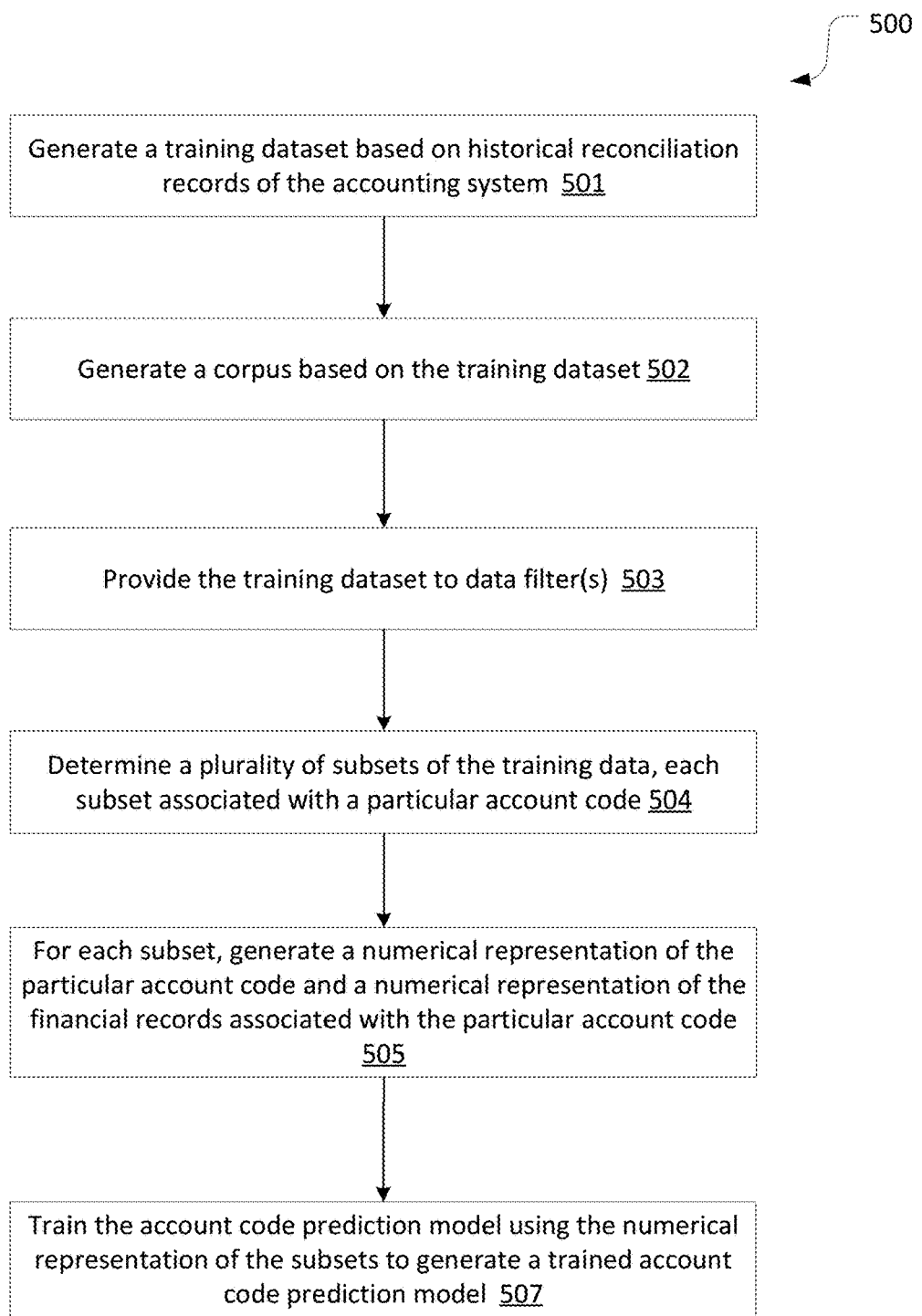
FIG. 5 is a process flow diagram of a method of training a numerical representation generation model and an account code prediction model, according to some embodiments.

FIG. 5 illustrates a process flow diagram of a method 500 of training the numerical representation generation model 204 and the account code prediction model 208, according to some embodiments.

At 501, the accounting system 110 generates or prepares a training dataset by extracting historical reconciliation records 217 from the accounting system database 213. The historical reconciliation records 217 comprises records generated automatically by the accounting system 110 and/or by users of the accounting system manually reconciling transactions or reconciling transactions based on defined rules. The historical reconciliation records 217 may comprise information about how historical financial records were assigned or associated with specific account codes by a large variety of users of the accounting system 110. The training dataset may also include historical financial records 215, and account code data 216 referred to by the historical reconciliation records 217. The table below illustrates an examples of a subset of a training dataset:

TABLE 1

Training Dataset Example

| Historical Financial Record (bank feed statement line) | Transaction Attributes | |
| --- | --- | --- |
| | Reconciled Entity Name | Reconciled Account Name and Code |
| Debit Card Purchase FACEBK *XX1XXXXXX1 fb.meadsIRL | Facebook | Advertising, Marketing and Promotion (727) |
| Mrs J Citizen Secretary Monthly Salary | Jane Citizen | Direct Wages (429) |
| NAB INTNL TRAN FEE - (SC) | NAB | Bank Fees (433) |
| Transfer from Mrs Jane Citizen NPP | Sally Fake | Freight and Courier (721) |
| Monthly Plan Fee | Westpac | Bank Fees (433) |
| Debit Card Purchase Paypal *EBAU AU GST11111111 AUS | Paypal - WPAC | Computer Expense (411) |

At 502, the accounting system 110 generates the corpus 205 or vocabulary based on the training dataset. The corpus 205 may comprise a mapping of each distinct text or character string in the training dataset to a numerical or vector representation. The generated corpus 205 may be used by the numerical representation generation model 204 to generate numerical representations or vectorise financial records or account code records, for example.

The corpus 205 or vocabulary based on the training dataset may be generated by tokenising each record in the training dataset. Tokenising each record in the training dataset may comprise splitting text into minimal meaningful units. With each record being a series of strings, tokenizing may include separating each distinct string (or token) in the series of strings. In some embodiments, the tokenisation may comprise separating each record into a series of n-character-grams. For example, with n as 3, the string 'hello' may be tokenized into the tokens: 'hel', 'ell' and 'llo'.

After tokenising each record in the training dataset, the frequency of each distinct token across the entire dataset may be determined. Tokens with a frequency below a defined corpus selection frequency threshold may be left out from the corpus 205. In some embodiments, each distinct token may be mapped to a number using purely monotonic identifiers. In some embodiments, a hash function may be used to map each token to a number or a vector. The size of the corpus or vocabulary may be in the range of 5,000 to 100,000 tokens for example.

At 503, in some embodiments, the accounting system 110 provides or passes the training dataset through one or more data filters. The data filters may be configured to remove records within the training dataset that do not comprise data of sufficient quality and/or relevance for the training process. For example, previously created test data may be removed using the one or more data filters. Removing records from the training dataset that do not comprise data of sufficient quality and/or relevance improves the accuracy and performance of the account code prediction model 208.

In some embodiments, the filter(s) may comprise filters configured to identify and remove records from the training dataset that are associated with extreme values. For example, records with exceedingly long strings may be considered as not containing sufficiently meaningful information. The data filter(s) may exclude such records from the training dataset. Alternatively, the data filter(s) may truncate the exceedingly long strings using a predefined truncation threshold. Truncating excessively long strings in the records in the training dataset balances the computational efficiency of the training process and the accuracy of the trained numerical representation generation model 204 and the account code prediction model 208.

At 504, the accounting system 110 splits or divides the training set into a plurality of subsets, including a training, validation and evaluation subset. The training subset may be used to train the numerical representation generation model 204 and the account code prediction model 208. The validation subset may be used to tune parameters of the training process or for feature selection or feature engineering. The evaluation subset may be used to benchmark the accuracy and performance of the trained numerical representation generation model 204 and the account code prediction model 208.

At 505, the accounting system 110 provides each subset to the numerical representation generation model 204, which generates, for each subset, a numerical representation of the particular account code and a numerical representation of the financial records associated with the particular account code. For example, the numerical representations are generated using any one of the techniques described above.

At 507, the accounting system 110 iteratively trains the account code prediction model 208 using the numerical representations of the particular account code and the financial records associated with the particular account code.

In embodiments where the account code prediction model 208 comprises a feedforward neural network, the training may be performed by calculating a categorical cross-entropy loss and adjusting the weights of the feedforward neural network using a training algorithm such as the backpropagation algorithm to iteratively adjust the weights of the feedforward neural network to obtain a trained account code prediction model 208.

In embodiments where the numeric representation generation model 204 comprises a word embedding generator neural network, the determined loss values (such as categorical cross-entropy loss) or feedback signals may also be used to iteratively adjust the weights of the neural network generating the numerical representations.

In some embodiments, the end to end training of the account code prediction model 208 and the numeric representation generation model 204 allows simultaneous training and improvements in both the models using a common training dataset.

The end to end training may comprise determining an error using a loss function based on the output produced by the output layer of neurons of the account code prediction model 208. The calculated error may be back-propagated through the various layers of neurons in the account code prediction model 208. Back-propagation of the error may include calculation of error gradients at each stage and adjustment of the weights of each layer of neurons based on the calculated error gradients. The back-propagation may continue further through to the input layer of the account code prediction model 208 and then onto the output layer of the numeric representation generation model 204. The back-propagation process may continue through the various layers of neurons in the numeric representation generation model 204, wherein at each stage a gradient may be calculated and weight of the neurons may be adjusted through all the layers of the numerical representation generation model 204.

In some embodiments, the account code prediction model 208 and the numeric representation generation model 204 may be trained using different learning rates to optimise the accuracy and performance of the combination of the models. For example, the learning rate for the numeric representation generation model 204 may be set to a higher value than the learning rate for the account code prediction model 208. This difference in learning rates may lead to the numeric representation generation model 204 being trained more quickly and the account code prediction model 208 adapting not only to the training dataset but also to the more quickly trained numeric representation generation model 204. In some embodiments, training of one of the models may be frozen partway through the training process, while the other model may continue to be trained.

Figure 6:
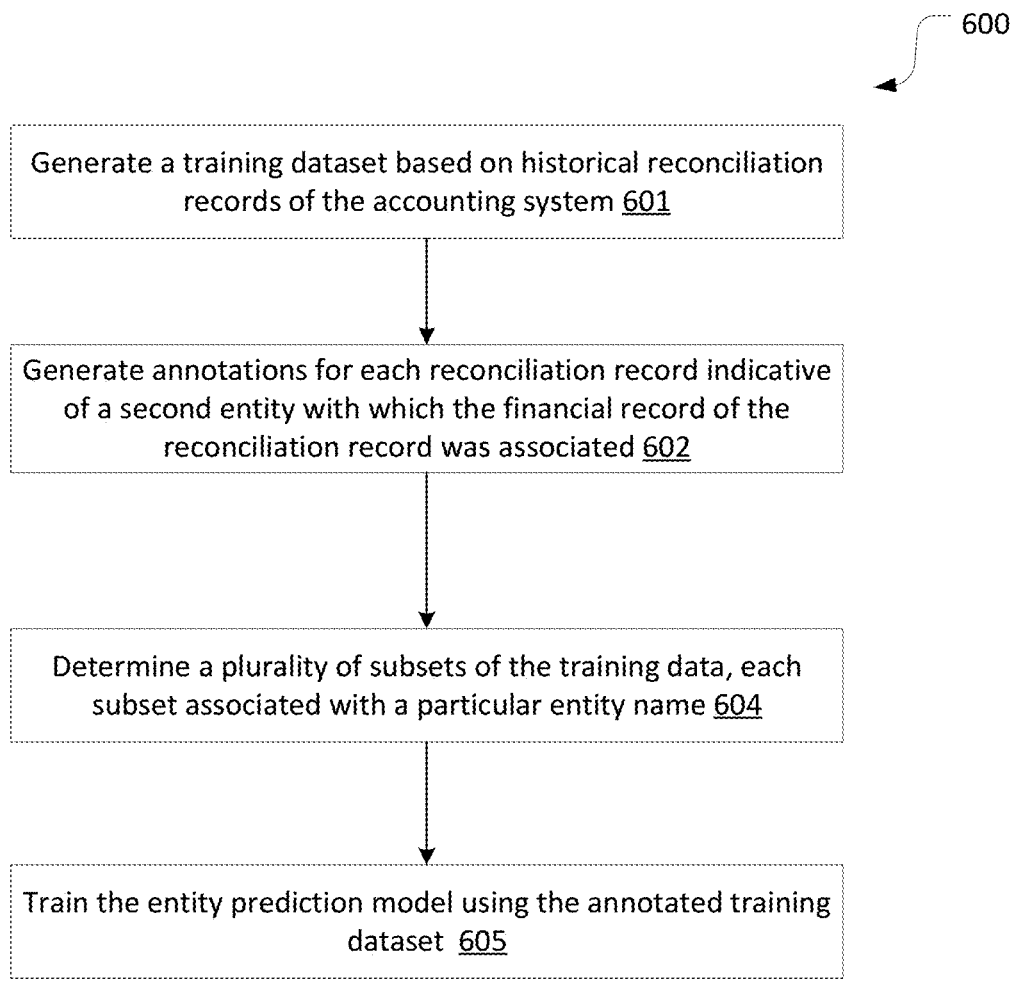
FIG. 6 is a process flow diagram of a method of training the entity prediction model, according to some embodiments.

FIG. 6 illustrates a process flow diagram of a method 600 of training the entity prediction model 209, according to some embodiments.

At 601, the accounting system 110 determines or generates a training dataset by extracting historical reconciliation records 217 and entity data 214. The entity data may comprise details of contacts of individuals or businesses as may have been created by users of the accounting system, including the user associated with the accounting entity. The historical reconciliation records 217 may be used to relate historical financial records 215 with entity data 214.

In the training dataset, the financial records 215 may be treated as inputs and the entity data 214 may be treated as outputs or labels used to generate a feedback or loss signal.

At 602, the accounting system 110 generates labels or annotations for each reconciliation record indicative of an entity name with which they were reconciled. In other words, the annotation identifies a second entity with which the financial record of the reconciliation record was associated, the second entity being the other entity to the transaction, the accounting entity being the first entity.

At 604, the accounting system 110 splits or divides the annotated training set into a plurality of subsets. The plurality of subsets may include a training dataset, a validation dataset and an evaluation dataset. The training subset may be used to train the entity prediction model 209. The validation subset may be used to tune parameters of the training process or for feature selection or feature engineering. The evaluation subset may be used to benchmark the accuracy and performance of the trained entity prediction model 209.

At 605, the accounting system 110 training iterations are executed to train the entity prediction model 209. In some embodiments, the entity prediction model 209 may be based on a publically available named entity recognition models such as named entity recognition models in the spaCy library or the Stanza library or the FLAIR library. In some embodiments, the publically available named entity recognition model may be specifically trained using the training dataset prepared at 601 to specifically tailor the publically available named entity recognition model based on the training dataset comprising financial records and entity data from the accounting system database 213.

FIG. 7 is a screenshot of an interface 700 generated by the reconciliation UI module 210 for reconciling a transaction based on attributes predicted by the transaction attribute prediction model 207 according to some embodiments. Region 701 of screenshot comprises details of a financial record illustrating some of the attributes associated with a transaction waiting to be reconciled. Reference numeral "703" is a data entry field 703 for identifying an entity associated with the transaction record illustrated in region 701. The data entry field 703 is prepopulated based on a prediction generated by the entity prediction model 209 according to step 307 of the process flow diagram of FIG. 3. Reference numeral "705" is a data entry field 705 for identifying an account code associated with the transaction record illustrated in region 701. The data entry field 705 is prepopulated based on a prediction generated by the account code prediction model 208 according to step 307 of the process flow diagram of FIG. 3. After reviewing the prepopulated details in fields 703 and 705, a user may confirm the reconciliation of the financial record by clicking on the 'ok' button 707.

The table below lists some embodiments with various configurations of the Numerical Representation Generation Model 204, the Account Code Prediction Model 208 and some parameters used for training the models.

TABLE 2

Model Configuration Examples

| Numerical Representation Generation Model 204 | Account Code Prediction Model 208 | Training Epochs and Dataset | Comments |
| --- | --- | --- | --- |
| Vocab size of 10,000 tokens used to generate averaged word embeddings using 64 | Feedforward Neural Network with 2 layers, and 64 - 32 | 100 epochs and 10,000 training examples | Categorical cross-entropy loss function used. |

TABLE 2-continued

Model Configuration Examples

| Numerical Representation Generation Model 204 | Account Code Prediction Model 208 | Training Epochs and Dataset | Comments |
|---|---|---|---|
| dimension vectors | Rectified Linear Units (ReLU) | | |
| Vocab size of 10,000 tokens used to generate averaged word embeddings using 64 dimension vectors | Feedforward Neural Network with 2 layers, and 64 - 32 ReLU | 6 epochs and 100,000 training examples | Categorical cross-entropy loss function used. |
| Vocab size of 10,000 tokens used to generate averaged word embeddings using 64 dimension vectors | Feedforward Neural Network with 2 layers, and 64 - 32 ReLU | 6 epochs and 100,000 training examples | The training process incorporated a learning scheduler to adjust the learning rate. The learning rate was scheduled to reduce as the calculated loss stagnated to improve performance. This allowed the models (204, 208) to take smaller steps while updating weights. Categorical cross-entropy loss function used. |
| Vocab size of 10,000 tokens used to generate averaged word embeddings using 64 dimension vectors | Feedforward Neural Network with 2 layers, and 64 - 32 ReLU | 30 epochs and 100,000 training examples | The learning rate was reduced every 4 epochs using learning rate decay values 0.2 or 0.5. Categorical cross-entropy loss function used. |
| Vocab size of 10,000 tokens used to generate averaged word embeddings using 64 dimension vectors | Feedforward Neural Network with 2 layers, and 64 - 32 ReLU | 6 epochs and 100,000 training examples | The account code prediction model 208's last dense layer's weights initialised using random numbers uniformly distributed between 0 and 1. Training records with invalid labels excluded. Learning rate initialised to 0.001 and reduced by 0.0002 after 3 epochs. Categorical cross-entropy loss function used. |
| Vocab size of 20,000 tokens used to generate averaged word embeddings using 64 dimension vectors | Feedforward Neural Network with 2 layers, and 64 - 32 ReLU | 30 epochs and 100,000 training examples | Learning Rate scheduler used with and initial learning rate of 0.001 and reduced every 4 epochs using a learning rate decay of 0.2 Categorical cross-entropy loss function used. |
| Vocab size of 20,000 tokens used to generate averaged word embeddings using 64 dimension vectors | Feedforward Neural Network with 2 layers, and 64 - 32 ReLU | 30 epochs and 100,000 training examples | An initial learning rate of 0.001 with a decay of 50% every 4 epochs used. The account code prediction model 208's last dense layer's weights initialised using random numbers uniformly distributed between 0 and 1. Training records with invalid labels excluded. Categorical cross-entropy loss function used. |

To effectively train an entity prediction model 209, a large number of annotated examples may be required. Manual annotation is expensive and labor intensive, and can often vary from person to person; there is a subjective aspect to annotating and not all human annotators tend to annotate the same records in the same way. Accordingly, an automatic approach to generating the training dataset as described with reference to FIG. 8 below, may provide distinct advantages in terms of time, cost and/or consistency.

With financial records, it can be the case that a named entity within a section of text, for example a statement line of a financial record, does not correspond with or relate to a contact or entity identifier with which the financial records gets reconciled. Accordingly, in some situations, reconciled financial records may not provide useful examples for training entity prediction models 209. For example, consider the character string or statement line of a financial record, "J Blogs AP 123456", which was reconciled to the contact "Joe Blogs". "Joe Blogs" may not be useful as a label that the entity prediction model 209 should aim to reproduce because that text or string is not actually present in the statement line. Furthermore, the start and end indices can't be determined because the string doesn't exist in the statement line.

In some embodiments, to train an entity prediction model 209, examples comprising a character string of a financial record, a label entity identifier (substring) extracted from the character string, and label start and end indices of the entity identifier within the character string of the financial record may be required.

Figure 8:
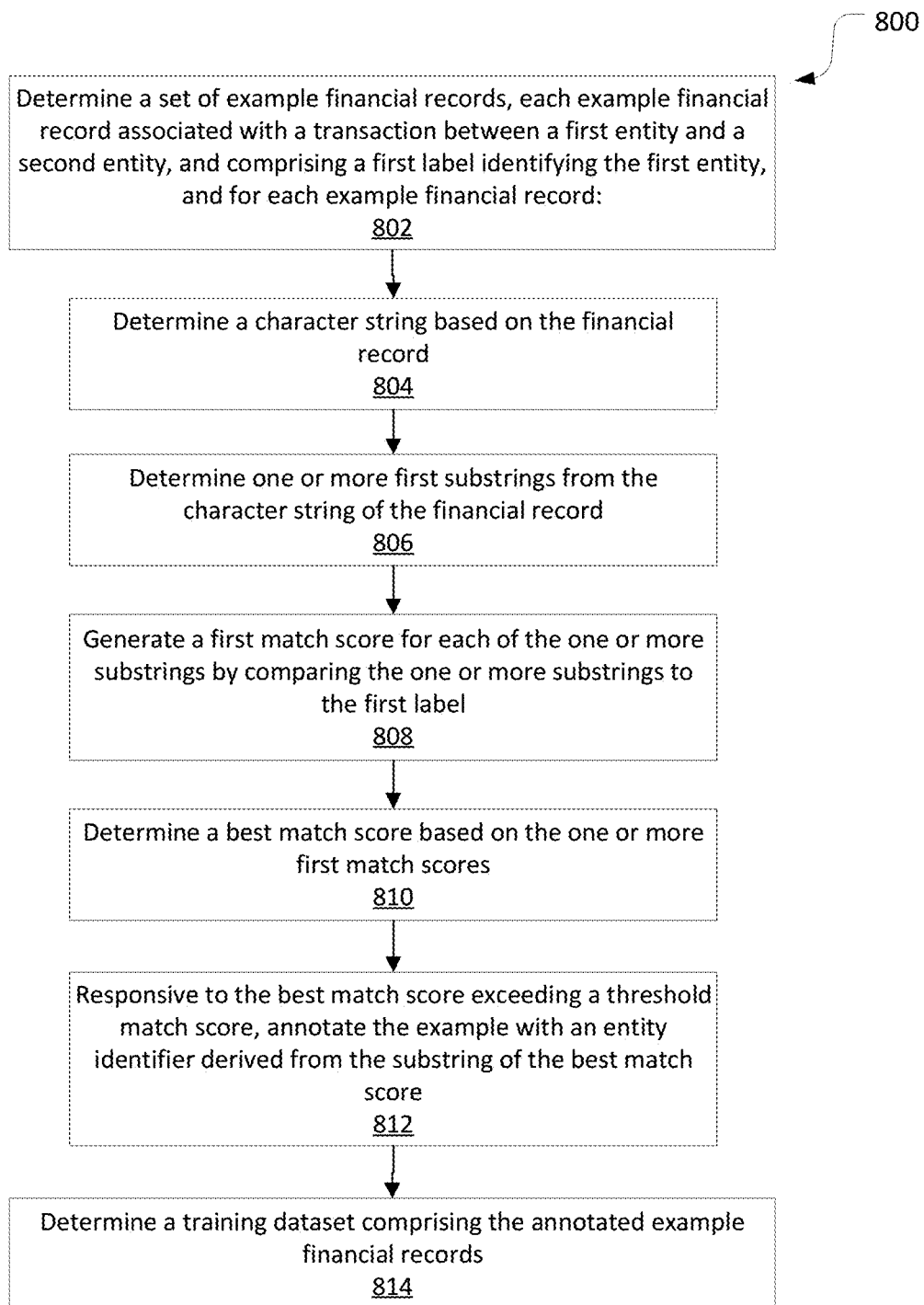
FIG. 8 is a process flow diagram of a method for generating a dataset of labelled examples, according to some embodiments.

FIG. 8 is a process flow diagram of a method 800 for generating a dataset of labelled examples, according to some embodiments. The method 800 may be performed by the processor(s) 202 of the accounting system 110 executing the modules and/or models stored in memory 203. In some embodiments, the method 800 may be performed by a different system to the accounting system 110.

At 802, the system 110 determines a set of example financial records. Each example financial record may be associated with a transaction between a first entity and a second entity. Each example financial record has or comprises a first label identifying the first entity. The set of example financial records may be obtained from the historical reconciliation records 217. The set of example financial records can be used to generate training dataset(s) of suitably labelled financial records for training an entity prediction model 209.

The system 110 may consider each of the plurality of example financial records, and may perform steps 804 to 812 for each example financial record.

At 804, the system 110 determines a data or character string based on the financial record. The character string may be a statement line of the financial record. The character string may comprise letters, symbols and/or words.

For example, consider a financial record that includes the following fields with respective values:
payee: "J Blogs"
reference: "AP 123456"
notes: " "

The character string or statement line may be determined to be: "J Blogs AP 123456"

At 806, the system 110 determines one or more first substrings from the character string of the financial record. In some embodiments, the system 110 determines one or more second substrings from the character string of the financial record. The one or more first substrings may be different from or may overlap with the one or more second substrings. The one or more first substrings may be tokens or n-grams, such as bigrams. Where the one or more first substrings are tokens, the one or more second substrings may be n-grams such as bigrams.

Tokens may represent individual letters, symbols or words or distinct substrings of the character string, for example, which may be spaced apart from other distinct substrings. Taking the above example, the tokens of the character string may be "J", "Blogs", "AP", and "123456".

Bigrams may represent groups of two distinct substrings of the character string, for example, which may be spaced apart from other distinct substrings. The substrings of the biogram may be neighbouring substrings of the character string of the financial record; a sequence of two adjacent elements from a data string of tokens. For example, a first biogram substring may include a first character substring and a second character substring being the next occurring or appearing character substring in the character string. A second or subsequent biogram substring may include the second character substring and a third biogram substring, being the next occurring or appearing character substring in the character string. Taking the above example, the bigrams of the character string may be "J Blogs", "Blogs AP", and "AP 123456".

In some embodiments, the one or more first substrings or the one or more second substrings may be multigrams (n-grams) representing groups of multiple distinct substrings of the character string. Any suitable number may be selected for the multigram.

At 808, the system 110 generates a first match score for each of the one or more substrings by comparing the one or more substrings to the first label.

In some embodiments, fuzzy matching techniques, such as the Python fuzzy matching library rapidfuzz, are used to perform matching. Fuzzy matching computes a similarity score between strings. Fuzzy matching may be based on Levenshtein distance. The similarity score may be indicative of a count of how many characters would need to be changed in order for the strings to match, adjusted to account for the length of the strings. By using fuzzy matching techniques, it is not only exact matches that are identified; inexact or similar matches are also determined. This can be useful in particular where exact replications of the first label don't appear in the financial record, or character string. For example, a first label for a financial record may be "Joe Blogs", but the character string may only contain the substring "J Blogs". By using a relatively high threshold value for considering candidate substrings as matching, only confident fuzzy matches are determined as matches.

At 810, the system 110 determines a best match score based on the one or more first match scores. In some embodiments, the system 110 determines a highest first match score of the one or more first match scores as the best match score.

In embodiments where one or more second substrings have been determined from the character string, the system 110 may generate a second match score for each of the one or more second substrings by comparing the one or more second substrings to the first label. The system 110 may determine a highest first match score of the one or more first match scores and a highest second match score of the one or more second match scores. The system 110 may determine the best match score as the greater of the highest first match score and the highest second match score.

Again, considering the above example, if the first label, or "paid to name" of the financial records is "Joe Blogs", a highest first match score may be "x" for "Blogs" (["Blogs", x]) and a highest second match score may be "y" for: J Blogs" ([J Blogs", y]). If the system 110 determines that "y" is greater than "x", the system 110 may determine that the second substring associated with the highest second match score, i.e., "J Blogs", is the best match.

At 812, responsive to the best match score exceeding a threshold match score, the system 110 annotates the example financial record with an entity identifier, the entity identifier being derived from the substring associated with the best match score.

The system 110 may further determine a position indicator for the substring associated with the best match score within the character string. The entity identifier may comprise or may be the position indicator. The position indicator may be a numerical representation for the position of the substring. For example, the position indicator may comprise a start index and an end index for the substring. In the above example, for the substring "J Blogs" in the characters string of the example financial records, the start index would be "0" and the end index would be "6". In other embodiments the position indicator may comprise a start index and a number of characters (or length) of the substring.

In some embodiments, the entity identifier may comprise, or may be, the substring associated with the best match score.

A threshold matching score may be used to ensure that where the best match score is relatively low, the example financial record is not annotated and does not get added to the training dataset. For example, responsive to the best match score not exceeding a threshold match score, the system 110 may discard or disregard the example financial record.

At 814, the system 110 determines or generates a training dataset comprising the annotated example financial records.

Figure 9:
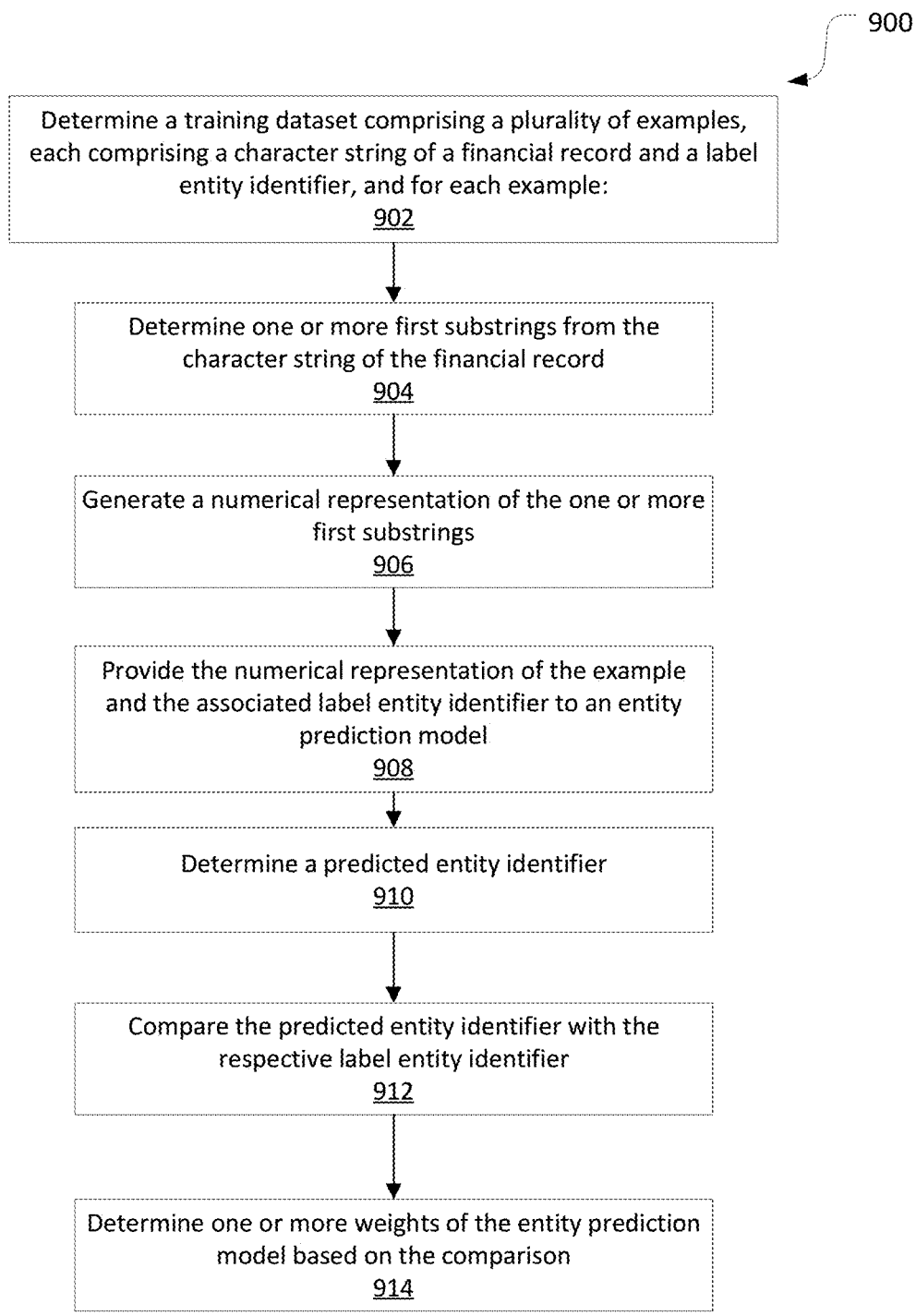
FIG. 9 is a process flow diagram of a method for training an entity prediction model, according to some embodiments.

FIG. 9 is a process flow diagram of a method 900 for training an entity prediction model 209, according to some embodiments. The method 900 may be performed by the processor(s) 202 of the accounting system 110 executing the modules and/or models stored in memory 203. In some embodiments, the method 900 may be performed by a different system to the accounting system 110.

At 902, the system 110 determines a training dataset comprising a plurality of examples. Each example comprises a character string of a financial record, and a label entity identifier. For example, the label entity identifier may comprise an entity identifier substring extracted from the character string, and/or a label position indicator of the entity identifier substring within the character string of the financial record. In some embodiments, the training dataset may have been generated according to the method 800 of FIG. 8.

The system 110 may perform steps 904 to 914 for each example.

At 904, the system 110 determines one or more first substrings from the character string of the financial record.

At 906, the system 110 provides the one or more first substrings to a numerical representation generation model 204 to generate a numerical representation of the example.

In some embodiments, the system 110 determines one or more second substrings from the character string of the financial record and provides the second substring(s) to the numerical representation generation model 204 to generate the numerical representation of the example.

For example, the first substrings and/or second substrings may be tokens, biograms or multigrams (n-grams).

At 908, the system 110 provides the numerical representation of the example as an input to an entity prediction model 209. The system 110 also provides the label entity identifier the entity prediction model 209. The entity prediction model 209 may be a natural language processing deep-learning model, such as the Python package spaCy (https://spacy.oi/).

At 910, the system 110 determines, as an output of the entity prediction model 209, a predicted entity identifier.

At 912, the system 110 compares the predicted entity identifier with the respective label entity identifier. In such embodiments, the entity prediction model 209 is configured to determine a confidence score for each of the substrings and to determine the predicted entity identifier as the substring with the highest confidence score, or a position indicator of the substring with the highest confidence score. The predicted entity identifier (substring and/or position indicator) is compared with the label entity identifier (substring and/or position indicator), and a loss function value, as for example, may be based on a categorical cross entropy, is determined.

At 914, the system 110 determines one or more weights of the entity prediction model 209 based on the comparison. In other words, the determined loss function value may be back propagated through the entity prediction model 209. For example, the system may adjust one or more weights of the entity prediction model 209 to train the entity prediction model 209 based on the training dataset.

Once the system 110 has performed steps 904 to 914 for each example, the entity prediction model 209 may be considered trained, and the entity prediction model 209 may be deployed for use to predict entity identifiers associated with candidate financial records, as discussed below with reference to FIG. 10.

Figure 10:
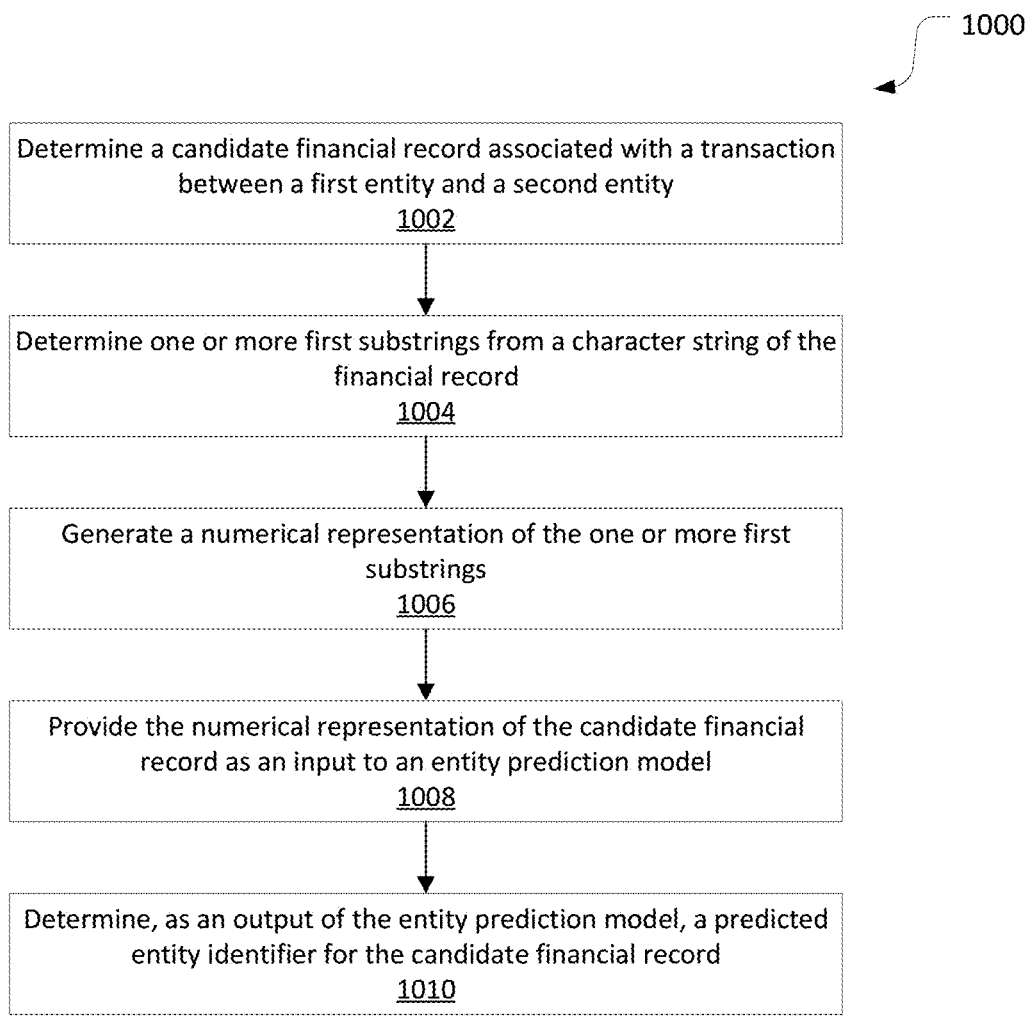
FIG. 10 is a process flow diagram of a method for determining an entity identifier for a financial record, according to some embodiments.

FIG. 10 is a process flow diagram of a method 1000 for determining an entity identifier for a financial record, according to some embodiment. The method 1000 may be performed by the processor(s) 202 of the accounting system 110 executing the modules and/or models stored in memory 203. In some embodiments, the method 1000 may be performed by a different system to the accounting system 110.

At 1002, the system 110 determines a candidate financial record associated with a transaction between a first entity and a second entity.

At 1004, the system 110 determines one or more first substrings from a character string of the financial record.

At 1006, the system 110 provides the one or more first substrings to a numerical representation generation model 204 to generate a numerical representation of the candidate financial record.

In some embodiments, the system 110 determines one or more second substrings from the character string of the financial record, and provides the second substring(s) to the numerical representation generation model 204 to generate the numerical representation of the candidate financial record.

At 1008, the system 110 provides the numerical representation of the candidate financial record as an input to an entity prediction model 209. For example, the entity prediction model 209 may be the trained entity prediction model 209, trained according to method 900 of FIG. 9.

At 1010, the system 110 determines, as an output of the entity prediction model 209, a predicted entity identifier for the candidate financial record. In some embodiments, the system 110 determines a plurality or a set of predicted entity identifiers for the financial records.

In other embodiments, the entity prediction model 209 may be a multi-class classifier. The multi-class classifier may be configured to classify a candidate financial record as being associated with one of a plurality of entity identifiers. The plurality of entity identifiers may correspond with the first set of entity identifiers discussed above, which may be derived from the global contact list.

When preparing the training dataset, the n most commonly occurring contacts in a database, such as the historical reconciled records 217, may be selected. For example, n may be 100. A most common format of the same contact for different examples may be taken. For example, where the database includes 100 "Amazons", 20 "amazons" and 50 "AMAZONS", the label may be taken to be "Amazon". The training data is mapped to n classes; each of "Amazons", "amazons" and "AMAZONS" map to "Amazon". In some embodiments, a training dataset of five million examples were used to train the multi-class classifier and 100,000 examples were used to validate the trained multi-class classifier.

The multi-class classifier may be based on Stochastic Gradient Descent (SGD), such as sk-learn SGDClassifier. The multi-class classifier may be based on a linear regression model or a logistic regression model. Balanced class weight may be used to counter any class imbalance issues.

The multi-class classifier may be configured to receive a numerical representation of a character string (for example, the statement line) of a candidate financial record. For example, the numerical representation generation model 204 may use the TF-IDF technique to generate the numerical representation, as discussed above. Word tokens and a vocabulary size of about 10,000 may be used. The multi-class classifier may determine a score indicative of the probability of the financial record matching any one of the multi classes. For example, the score may be converted into a probability value using a softmax function layer.

With this approach, it is relatively easy to create labeled examples for the training dataset, and common contacts are assumed to be of relatively high quality. In general, a relatively small number of contacts (for example, 100 out of one billion) are used to reconcile about 15% of financial records. Taking this approach, about 14% coverage at 50% accuracy level can be achieved with exact contact matching, and a 17% coverage at 50% accuracy level can be achieved with sub-string contact matching.

Once the system 110 has determined a predicted entity identifier, or a set of predicted entity identifiers using method 1000 and/or the multi-class approach discussed immediately above, the system 110 may attempt to match the predicted entity identifier(s) to existing contacts in a global list of contacts, generated from the contacts of the network of users of the accounting system, or a local list of contacts, which may be specific to the user or second entity. Comparing the predicted entity identifier(s) to a global or local list of contacts may be advantageous as it may minimise suggestions being made from raw substring extractions, and/or may ensure higher confidence in the suggestions.

In some embodiments, a first predicted entity identifier (or first group of predicted entity identifiers) as determined using method 1000 and a second predicted entity identifier (or second group of predicted entity identifiers) determined using the multi-class approach discussed above are combined to generate a combined, longest or composite predicted entity identifier (or combined group of predicted entity identifiers). For example, the system 110 may be configured to consider a distance between the predicted entity identifiers of the two approaches and use that to determine a confidence score. In some embodiments, the combined predicted entity identifier may be determined as a longest common sequence between the first predicted entity identifier and the second predicted entity identifier. For example, if the first predicted entity identifier is "Amazon Inc" and the second predicted entity identifier is "Amazon Web Services", the system 110 may determine the combined predicted entity identifier to be "Amazon".

In some embodiments, a first predicted entity identifier (or first group of predicted entity identifiers) as determined using method 1000 and a second predicted entity identifier (or second group of predicted entity identifiers) determined using the multi-class approach are generated. Where method 1000 fails to determine a first predicted entity identifier or fails to determine a first predicted entity identifier with a sufficient confidence, the system 110 may select (or prefer) the second predicted entity identifier (or second group of predicted entity identifiers).

In some embodiments, the system 110 compares the predicted entity identifier (or each predicted entity identifier of the set of predicted entity identifiers) or the combined predicted entity identifier (or each predicted entity identifier of the combined group of predicted entity identifiers) with each entity identifier in a first set of entity identifiers to generate a first set of suggested entity identifiers for the candidate financial record. For example, the first set of entity identifiers may be derived from a global contact list of entity identifiers. For example, the global contact list of entity identifiers may be based on contacts or entity identifiers used across a network of users of the accounting system 110. The first set of entity identifiers may include a subset of the global contact list, such as the most used entity identifiers, such as the 100 most commonly used entity identifiers. Such entity identifiers may include "Amazon" for example. The first set of entity identifiers may include contacts that may have a global presence, and may not necessarily be associated with a particular geographical region. In some embodiments, the first set of entity identifiers may be derived from most used (or most often reconciled) entity identifiers for a particular geographical region.

In some embodiments, the system 110 compares the predicted entity identifier (or each predicted entity identifier of the set of predicted entity identifiers) with each entity identifier in a second set of entity identifiers to generate a second set of suggested entity identifiers for the candidate financial record. For example, the second set of entity identifiers may be, or may be derived from, a contact list of a user or second entity.

In some embodiments, the system 110 compares the predicted entity identifier of the first set of suggested entity identifiers for the candidate financial record with each entity identifier in the second set of entity identifiers to generate a second set of suggested entity identifiers for the candidate financial record.

The first and/or second set of suggested entity identifiers may be used to reconcile the financial record automatically, for example, by selecting the most likely suggestion. In some embodiments, the first and/or second set of suggested entity identifiers may be displayed to a user to allow the user to select which entity identifier of the first and/or second set (local or global contact lists) of suggested entity identifiers to allocate to the financial record for reconciling purposes.

In some embodiments, the comparison of the predicted entity identifier (or each predicted entity identifier of the set of predicted entity identifiers) with the first and/or second set of entity identifiers is performed using fuzzy matching techniques, such as the Python fuzzy matching library rapidfuzz, as discussed above.

In some embodiments, where the system 110 generates a first predicted entity identifier (or first group of predicted entity identifiers) using method 1000 and a second predicted entity identifier (or second group of predicted entity identifiers) using the multi-class approach, the system 110 may separately compare each of the first predicted entity identifier (or first group) and second predicted entity identifier (or second group) with the first and/or second set of entity identifiers using fuzzy matching techniques, to determine a first suggested entity identifier (based on method 100) and a second first suggested entity identifier (based on the multi-class classifier prediction). The system 110 may then automatically select the better option, or may provide both suggestions to a user to select which to use to reconcile the financial record.

In some embodiments, if the system 110 does not determine any suggested entity identifier, the system 110 may generate a new contact record in the contact list of the user and may populate it with the predicted entity identifier.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method comprising:
    determining, by an accounting system comprising memory, and one or more processors configured to execute instructions stored in the memory, a candidate financial record associated with a transaction between a first entity and a second entity;
    determining, by the accounting system, one or more first substrings from a character string of the financial record;
    training a numerical representation generation model using training data comprising a corpus generated from historical transaction records;
        providing, by the accounting system, the one or more first substrings to the numerical representation generation model;
        generating, by the numerical representation generation model, a numerical representation of the candidate financial record based on the one or more first substrings;
    training a first entity prediction model using training data comprising example financial records annotated with a respective identifier to generate a first trained entity prediction model:
        providing, by the accounting system, the numerical representation of the candidate financial record as an input to the first trained entity prediction model;
        determining, by the first trained entity prediction model, a first predicted entity identifier;
    training a second entity prediction model using training data comprising example financial records annotated with a respective identifier to generate a second trained entity prediction model, wherein the second trained entity prediction model is a multi-class classifier and wherein the multi-class classifier is configured to classify a candidate financial record as being associated with one of a first set of entity identifiers;
        providing, by the accounting system, the numerical representation of the candidate financial record as an input to the second trained entity prediction model;
        determining, by the second trained entity prediction model, a second predicted entity identifier;
        combining, by the accounting system, the first predicted entity identifier and the second predicted entity identifier to generate a combined predicted entity identifier by determining a longest common sequence between the first predicted identifier and the second predicted identifier;
        determining, by the accounting system, a first set of suggested entity identifiers for the candidate financial record based on the combined predicted entity identifier; and
        using, by the accounting system, a suggested entity identifier from the first set of suggested entity identifiers to:
            (i) reconcile the candidate financial record with a respective accounting record of the accounting system; or (ii) create a new accounting record in the accounting system;
        wherein generating the numerical representation of the candidate financial record comprises:
            generating, by the accounting system, a first set of tokens by tokenising each of the one or more first substrings;
            generating, by the numerical representation generation model, a numerical representation of each token of the first set of tokens; and
            determining the numerical representation of the candidate financial record as a function of the numerical representations of each token of the first set of tokens.

2. The method of claim 1, wherein the first set of suggested entity identifiers for the candidate financial record is or comprises the combined predicted entity identifier.

3. The method of claim 1, wherein the first set of entity identifiers is derived from: (i) a global contact list of the accounting system, (ii) a local contact list specific to a user of the accounting system; or (iii) the global contact list of the accounting system and the local contact list specific to a user of the accounting system.

4. The method of claim 1, wherein determining by the accounting system, a first set of suggested entity identifiers for the candidate financial record based on the combined predicted entity identifier comprises comparing the combined predicted entity identifier with a second set of entity identifiers.

5. The method of claim 4, wherein the second set of entity identifiers is derived from: (i) a global contact list of the accounting system, (ii) a local contact list specific to a user of the accounting system; or (iii) the global contact list of the accounting system and the local contact list specific to a user of the accounting system.

6. The method of claim 4, wherein comparing the combined predicted entity identifier with the second set of entity identifiers comprises using fuzzy matching techniques.

7. The method of claim 1, further comprising determining the suggested entity identifier from the first set of suggested entity identifiers, wherein determining the suggested entity identifier comprise providing to a user interface of the accounting system the first set of suggested entity identifiers and receiving via the user interface a user selected entity identifier of the first set of suggested entity identifiers, wherein the user selected entity identifier is the suggested entity identifier.

8. The method of claim 1, further comprising:
    determining one or more second substrings from the character string of the financial record, wherein the one or more second substrings are different from the one or more first substrings; and
    providing the one or more second substrings with the one or more first substrings to the numerical representation generation model to generate the numerical representation of the candidate financial record;
    wherein generating the numerical representation of the candidate financial record further comprises:
        generating, by the accounting system, a second set of tokens by tokenising each of the one or more second substrings;
        generating, by the numerical representation generation model, a numerical representation of each token of the second set of tokens; and
        determining the numerical representation of the candidate financial record as a function of the numerical representations of each token of the first and second sets of tokens.

9. An accounting system comprising:
    one or more processors; and
    memory comprising computer executable instructions, which when executed by the one or more processors, causes the accounting system to:

determine a candidate financial record associated with a transaction between a first entity and a second entity;

determine one or more first substrings from a character string of the financial record;

train a numerical representation generation model using training data comprising a corpus generated from historical transaction records:

provide the one or more first substrings to the numerical representation generation model;

generate, by the numerical representation generation model, a numerical representation of the candidate financial record based on the one or more first substrings;

train a first entity prediction model using training data comprising example financial records annotated with a respective identifier to generate a first trained entity prediction model;

provide the numerical representation of the candidate financial record as an input to the first trained entity prediction model;

determine, by the first trained entity prediction model, a first predicted entity identifier;

train a second entity prediction model using training data comprising example financial records annotated with a respective identifier to generate a second trained entity prediction model, wherein the second entity prediction model is a multi-class classifier, and wherein the multi-class classifier is configured to classify a candidate financial record as being associated with one of a first set of entity identifiers;

provide the numerical representation of the candidate financial record as an input to the second trained entity prediction model;

determine, by the second trained entity prediction model, a second predicted entity identifier;

combine the first predicted entity identifier and the second predicted entity identifier to generate a combined predicted entity identifier by determining a longest common sequence between the first predicted identifier and the second predicted identifier;

determine a first set of suggested entity identifiers for the candidate financial record based on the combined predicted entity identifier; and use a suggested entity identifier from the first set of suggested entity identifiers to: (i) reconcile the candidate financial record with a respective accounting record of an accounting system; or (ii) create a new accounting record in the accounting system;

wherein generating the numerical representation of the candidate financial record comprises:

generating a first set of tokens by tokenising each of the one or more first substrings;

generating, by the numerical representation generation model, a numerical representation of each token of the first set of tokens; and determining the numerical representation of the candidate financial record as a function of the numerical representations of each token of the first set of tokens.

10. The system of claim 9, wherein the first set of entity identifiers is derived from: (i) a global contact list of the accounting system, (ii) a local contact list specific to a user of the accounting system; or (iii) the global contact list of the accounting system and the local contact list specific to a user of the accounting system.

11. The system of claim 9, wherein determining by the accounting system, a first set of suggested entity identifiers for the candidate financial record based on the combined predicted entity identifier comprises comparing the combined predicted entity identifier with a second set of entity identifiers.

12. The system of claim 9, wherein the second set of entity identifiers is derived from: (i) a global contact list of the accounting system, (ii) a local contact list specific to a user of the accounting system; or (iii) the global contact list of the accounting system and the local contact list specific to a user of the accounting system.

13. A computer-readable storage medium storing instructions that, when executed by a computer, cause the computer to perform operations including:

determining a candidate financial record associated with a transaction between a first entity and a second entity;

determining one or more first substrings from a character string of the financial record;

training a numerical representation generation model using training data comprising a corpus generated from historical transaction records;

providing the one or more first substrings to a numerical representation generation model;

generating, by the numerical representation generation model, a numerical representation of the candidate financial record based on the one or more first substrings;

training a first entity prediction model using training data comprising example financial records annotated with a respective identifier to generate a first trained entity prediction model;

providing, the numerical representation of the candidate financial record as an input to the first trained entity prediction model;

determining, by the first trained entity prediction model, a first predicted entity identifier;

training a second entity prediction model using training data comprising example financial records annotated with a respective identifier to generate a second trained entity prediction model, wherein the second trained entity prediction model is a multi-class classifier and wherein the multi-class classifier is configured to classify a candidate financial record as being associated with one of a first set of entity identifiers;

providing the numerical representation of the candidate financial record as an input to the second trained entity prediction model;

determining, by the second trained entity prediction model, a second predicted entity identifier;

combining the first predicted entity identifier and the second predicted entity identifier to generate a combined predicted entity identifier by determining a longest common sequence between the first predicted identifier and the second predicted identifier;

determining a first set of suggested entity identifiers for the candidate financial record based on the combined predicted entity identifier; and using a suggested entity identifier from the first set of suggested entity identifiers to: (i) reconcile the candidate financial record with a respective accounting record of an accounting system; or (ii) create a new accounting record in the accounting system;

wherein generating the numerical representation of the candidate financial record comprises:

generating a first set of tokens by tokenising each of the one or more first substrings;

generating, by the numerical representation generation model, a numerical representation of each token of the first set of tokens; and determining the numerical representation of the candidate financial record as a function of the numerical representations of each token of the first set of tokens.

14. The computer-readable storage medium of claim 13, wherein the first set of entity identifiers is derived from: (i) a global contact list of the accounting system, (ii) a local contact list specific to a user of the accounting system; or (iii) the global contact list of the accounting system and the local contact list specific to a user of the accounting system.

15. The computer-readable storage medium of claim 13, wherein determining by the accounting system, a first set of suggested entity identifiers for the candidate financial record based on the combined predicted entity identifier comprises comparing the combined predicted entity identifier with a second set of entity identifiers.

16. The computer-readable storage medium of claim 13, wherein the second set of entity identifiers is derived from: (i) a global contact list of the accounting system, (ii) a local contact list specific to a user of the accounting system; or (iii) the global contact list of the accounting system and the local contact list specific to a user of the accounting system.

* * * * *